United States Patent
Gupta et al.

(10) Patent No.: US 10,917,787 B2
(45) Date of Patent: Feb. 9, 2021

(54) SECURITY GATEWAY FOR A REGIONAL/HOME NETWORK

(71) Applicant: McAfee, LLC, Santa Clara, CA (US)

(72) Inventors: Bikram Kumar Gupta, Sunnyvale, CA (US); Simon Hunt, Naples, FL (US); Vinay Anand, San Jose, CA (US)

(73) Assignee: MCAFEE, LLC, San Jose, CA (US)

( * ) Notice: Subject to any disclaimer, the term of this patent is extended or adjusted under 35 U.S.C. 154(b) by 221 days.

(21) Appl. No.: 15/038,404

(22) PCT Filed: Dec. 20, 2013

(86) PCT No.: PCT/US2013/077220
§ 371 (c)(1),
(2) Date: May 20, 2016

(87) PCT Pub. No.: WO2015/094368
PCT Pub. Date: Jun. 25, 2015

(65) Prior Publication Data
US 2016/0295410 A1  Oct. 6, 2016

(51) Int. Cl.
*H04W 12/06* (2009.01)
*H04W 76/18* (2018.01)
(Continued)

(52) U.S. Cl.
CPC ......... *H04W 12/06* (2013.01); *H04L 63/0876* (2013.01); *H04L 63/0884* (2013.01);
(Continued)

(58) Field of Classification Search
None
See application file for complete search history.

(56) References Cited

U.S. PATENT DOCUMENTS 8,032,115 B1 * 10/2011 Breau ................ H04L 63/0876
455/411
9,628,484 B2 * 4/2017 Perrone, II .......... H04L 63/0892
(Continued)

FOREIGN PATENT DOCUMENTS

JP   2003216447    7/2003
JP   2007293887 A  11/2007
(Continued)

OTHER PUBLICATIONS

International Search Report and the Written Opinion of the International Searching Authority, dated Sep. 25, 2014, 13 pages.
(Continued)

*Primary Examiner* — Charles N Appiah
*Assistant Examiner* — Frank E Donado
(74) *Attorney, Agent, or Firm* — Hanley, Flight & Zimmerman, LLC

(57) ABSTRACT

Systems, devices and methods to protect a regional network (e.g., home network) by monitoring devices connected to and attempting to connect to the regional network. Monitoring includes assessing and addressing security concerns regarding devices attempting to or available to connect to the regional network as well as monitoring configurations and activity of connected devices. Devices to monitor include: computers, Personal Digital Assistants (PDAs), laptops, tablets, home appliances, smartphones, smart televisions, and any other type of device in the logical proximity of the regional network.

22 Claims, 12 Drawing Sheets

(51) Int. Cl.
*H04W 12/08* (2009.01)
*H04L 29/06* (2006.01)
*H04W 88/06* (2009.01)

(52) U.S. Cl.
CPC .......... *H04L 63/10* (2013.01); *H04L 63/1408* (2013.01); *H04L 63/1441* (2013.01); *H04W 12/08* (2013.01); *H04W 76/18* (2018.02); *H04L 63/20* (2013.01); *H04W 88/06* (2013.01)

(56) References Cited

U.S. PATENT DOCUMENTS

| | | | |
|---|---|---|---|
| 9,769,852 B2* | 9/2017 | Turanyi | H04W 76/10 |
| 2003/0217110 A1 | 11/2003 | Weiss | |
| 2004/0010327 A1 | 1/2004 | Terashima et al. | |
| 2004/0015985 A1 | 1/2004 | Kweon | |
| 2004/0038690 A1 | 2/2004 | Lee et al. | |
| 2007/0204039 A1 | 8/2007 | Inamdar | |
| 2007/0220252 A1* | 9/2007 | Sinko | H04L 63/101 |
| | | | 713/168 |
| 2009/0043872 A1* | 2/2009 | Holzer | G06Q 10/10 |
| | | | 709/222 |
| 2009/0122968 A1* | 5/2009 | Kutt | H04L 51/04 |
| | | | 379/93.05 |
| 2009/0207805 A1* | 8/2009 | Zou | H04W 60/04 |
| | | | 370/331 |
| 2010/0161794 A1* | 6/2010 | Horn | H04W 48/02 |
| | | | 709/224 |
| 2012/0129498 A1 | 5/2012 | Morikuni et al. | |
| 2012/0157043 A1* | 6/2012 | LaJoie | G06Q 30/0256 |
| | | | 455/407 |
| 2012/0331556 A1 | 12/2012 | Alperovitch et al. | |
| 2013/0060942 A1* | 3/2013 | Ansari | H04L 67/20 |
| | | | 709/225 |
| 2013/0198274 A1 | 8/2013 | Papakipos et al. | |
| 2013/0210379 A1 | 8/2013 | Cloutier | |
| 2013/0239182 A1* | 9/2013 | Pierson | H04L 63/0876 |
| | | | 726/4 |
| 2014/0068030 A1* | 3/2014 | Chambers | H04L 41/0809 |
| | | | 709/220 |
| 2014/0092891 A1* | 4/2014 | Ahmadvand | H04W 36/0066 |
| | | | 370/338 |
| 2014/0105111 A1* | 4/2014 | Karaoguz | H04W 24/02 |
| | | | 370/328 |
| 2014/0281497 A1* | 9/2014 | Medvinsky | H04L 9/0825 |
| | | | 713/156 |
| 2014/0315560 A1* | 10/2014 | Smith | H04W 16/14 |
| | | | 455/450 |
| 2015/0003361 A1* | 1/2015 | Palat | H04W 52/0258 |
| | | | 370/329 |
| 2015/0018003 A1* | 1/2015 | Zhou | H04W 4/021 |
| | | | 455/456.1 |
| 2015/0026779 A1* | 1/2015 | Ilsar | H04W 12/003 |
| | | | 726/5 |
| 2015/0156191 A1* | 6/2015 | Schmidt | H04W 12/06 |
| | | | 726/4 |
| 2015/0172981 A1* | 6/2015 | Janakiraman | H04W 36/14 |
| | | | 370/241 |
| 2016/0057002 A1* | 2/2016 | Burks | G06F 9/44505 |
| | | | 455/418 |
| 2016/0142776 A1* | 5/2016 | Meijer | H04L 12/2829 |
| | | | 725/28 |
| 2018/0262810 A1* | 9/2018 | Cronk | H04N 21/47202 |

FOREIGN PATENT DOCUMENTS

| | | |
|---|---|---|
| KR | 10-20130088041 A | 8/2013 |
| WO | 2011149532 | 12/2011 |
| WO | 2013170913 | 11/2013 |

OTHER PUBLICATIONS

European Search Report, dated Jul. 13, 2017, 13 pages.
State Intellectual Property Office of China, "First Office Action," mailed in connection with Chinese Patent Application No. 201380081108.1, dated Jul. 20, 2018, 14 pages.
Japanese Patent Office, "Office Action," mailed in connection with Japanese Patent Application No. 2016-532582, dated Mar. 27, 2018, 5 pages.
European Patent Office, "Extended European Search Report," mailed in connection with European Patent Application No. 13899672.3, dated Nov. 28, 2017, 14 pages.
Korean Patent Office, "Notice of Preliminary Rejection," mailed in connection with Korean Patent Application No. 2016-7013285, dated Apr. 11, 2017, 7 pages.
Nikkei Business Publications, Inc., "Smartphones and Tablets Compact Usage Guide for Business," May 16, 2013, 1 page (The relevance of this reference is discussed in the Japanese Office Action dated Mar. 27, 2018, submitted herewith).
Korean Intellectual Property Office, "Notice of Allowance," mailed in connection with Korean Patent Application No. 10-2016-7013285, dated Jul. 26, 2017, 4 pages.
Japanese Patent Office, "Office Action," mailed in connection with Japanese Patent Application No. 2016-532582, dated Aug. 1, 2017, 9 pages.

* cited by examiner

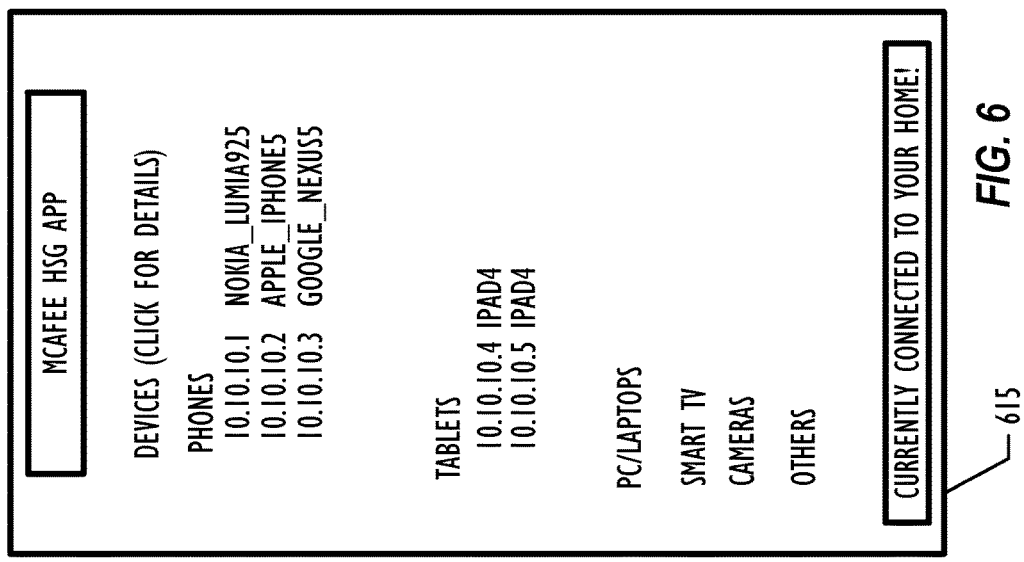
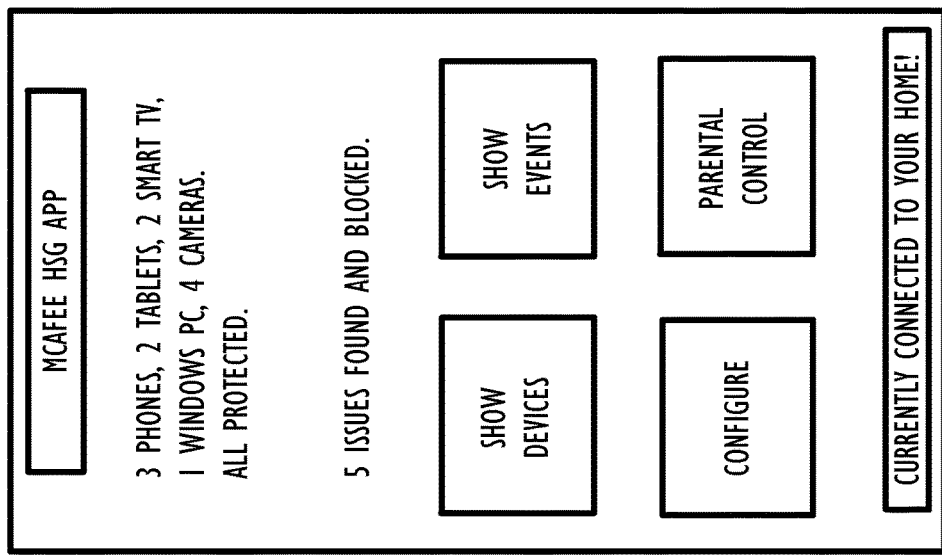
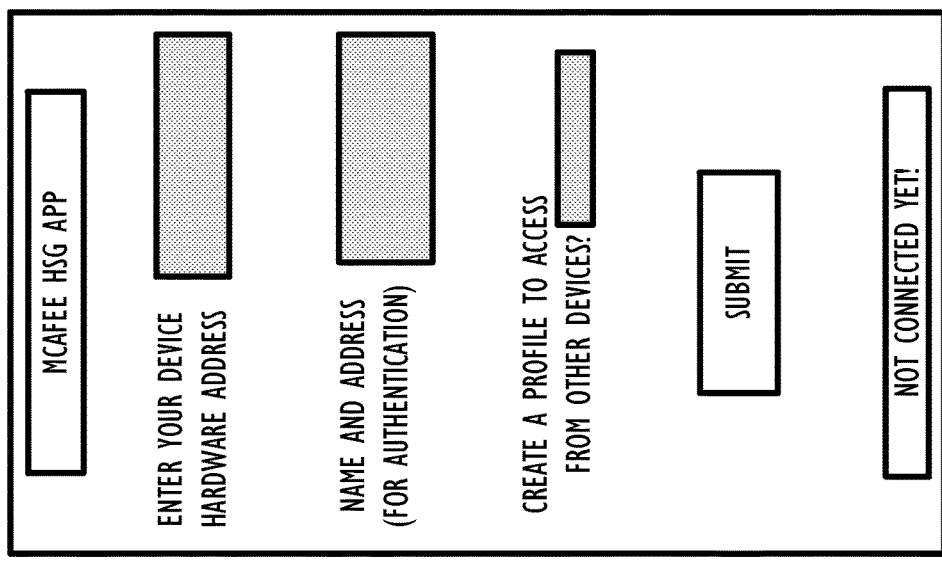
FIG. 6

SECURITY GATEWAY FOR A REGIONAL/HOME NETWORK

TECHNICAL FIELD

Embodiments described herein generally relate to monitoring of a regional (e.g., home) network to assist in properly and securely allowing many different types of devices to connect to the regional network.

BACKGROUND

Today, more and more types of devices are becoming network enabled. By 2020 it is estimated there could be 50 billion devices connected to the Internet, as opposed to 6 billon people. In a home network, for example, televisions, thermostats, home security systems, sound systems, power meters, home appliances, gaming systems, health care devices, etc. may be network enabled in addition to traditional computing devices such as laptops, desktops, tablets, etc. Often these network enabled devices will attempt to connect wirelessly and automatically to the home network. As anyone skilled in the art would understand, any type of connection could present a security or performance concern for the network itself as well as any other devices connected to the network. The typical home owner may not realize that connecting their new television in order to download/stream a movie could pose a security threat to their home network.

In addition to the above mentioned issues, the typical home network will become more complex in the future. Further, as more and more devices are connected to a home network, administration of the number of devices and number of devices needing security updates will become more complex. Home network administrators will therefore require more easily understandable and useable network administration tools than a professional network administrator.

This disclosure addresses the issues discussed above and many more by providing a comprehensive and easy to use/understand set of administration and security tools via a consumer device attached to the home network and optionally supported remotely with the assistance of a security operations center (SOC).

BRIEF DESCRIPTION OF DRAWINGS

FIG. 6 is a block diagram illustrating one possible interface to an application for interacting with an HSG either locally or remotely according to one or more disclosed embodiments.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a programmable device" can refer to a single programmable device or a plurality of programmable devices working together to perform the function described as being performed on or by a programmable device.

Although described below in terms of a home network environment, the techniques described below are not limited to such an embodiment, but may be used in any network environment in which a device such as the disclosed HSG device would be beneficial. For example a restaurant allowing access to a public network while maintaining a second network protected by an HSG, a church or club network, a regional office environment, etc.

Figure 1:
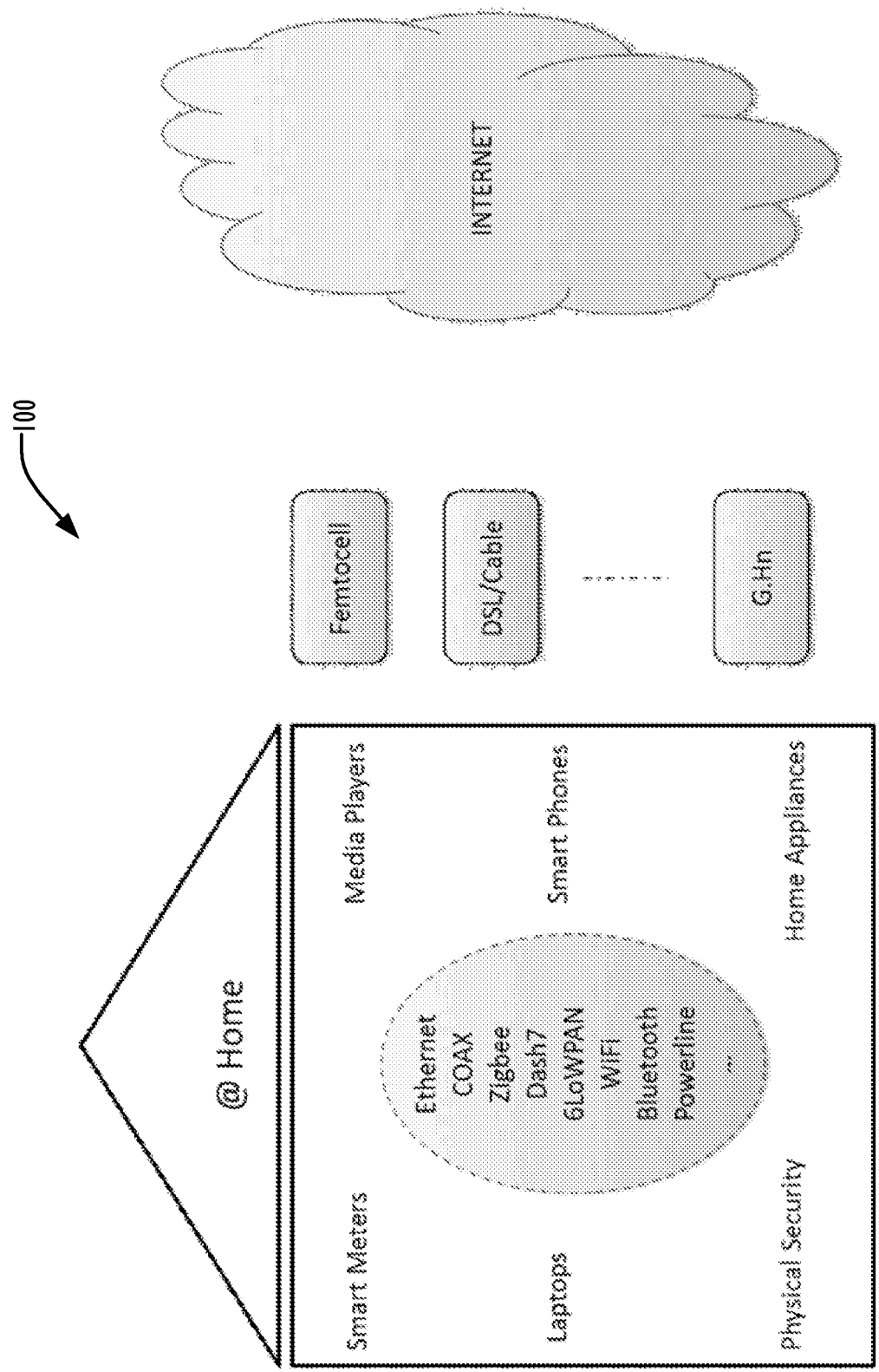
FIG. 1 is a block diagram illustrating a home with a plurality of different network types and network devices that could potentially connect to the Internet.

FIG. 1 is a block diagram 100 illustrating a typical house with a plurality of network enabled devices and a plurality of different network technologies. Devices such as laptops and smart phones are conventionally thought of as devices needing network protection, however, many other types of devices are being used in a home environment that require or desire network accessibility. In some instances the devices are intending to communicate only within a home (e.g., a wireless speaker) while in other instances the devices are intending to communicate via the Internet (e.g., security system with remote monitoring capability, smart meter sending information to electricity provider, etc.). As shown in diagram 100 there can be many different types of wired and wireless network technologies active in a single home. Some of the wireless technologies have very limited distances over which they communicate (e.g., Bluetooth, Zigbee) while other types of wireless technologies can communicate a more substantial distance (e.g., Wi-Fi). Wired technologies include communication capabilities over power lines, cable provider networks, and phone company networks. A typical house will connect to the Internet using a modem configured for a DSL network or a Cable network. Other less common Internet connection types are available (e.g., satellite) and this disclosure is not to be construed as to limited to a particular type of Internet connection. Once a device of any type connects to a network that is in turn connected to an external network such as the Internet there can be a security threat to both the device and the network because someone could attempt to infiltrate the network/device with some sort of computer virus (e.g., malware, Trojan horse, etc.).

Figure 2:
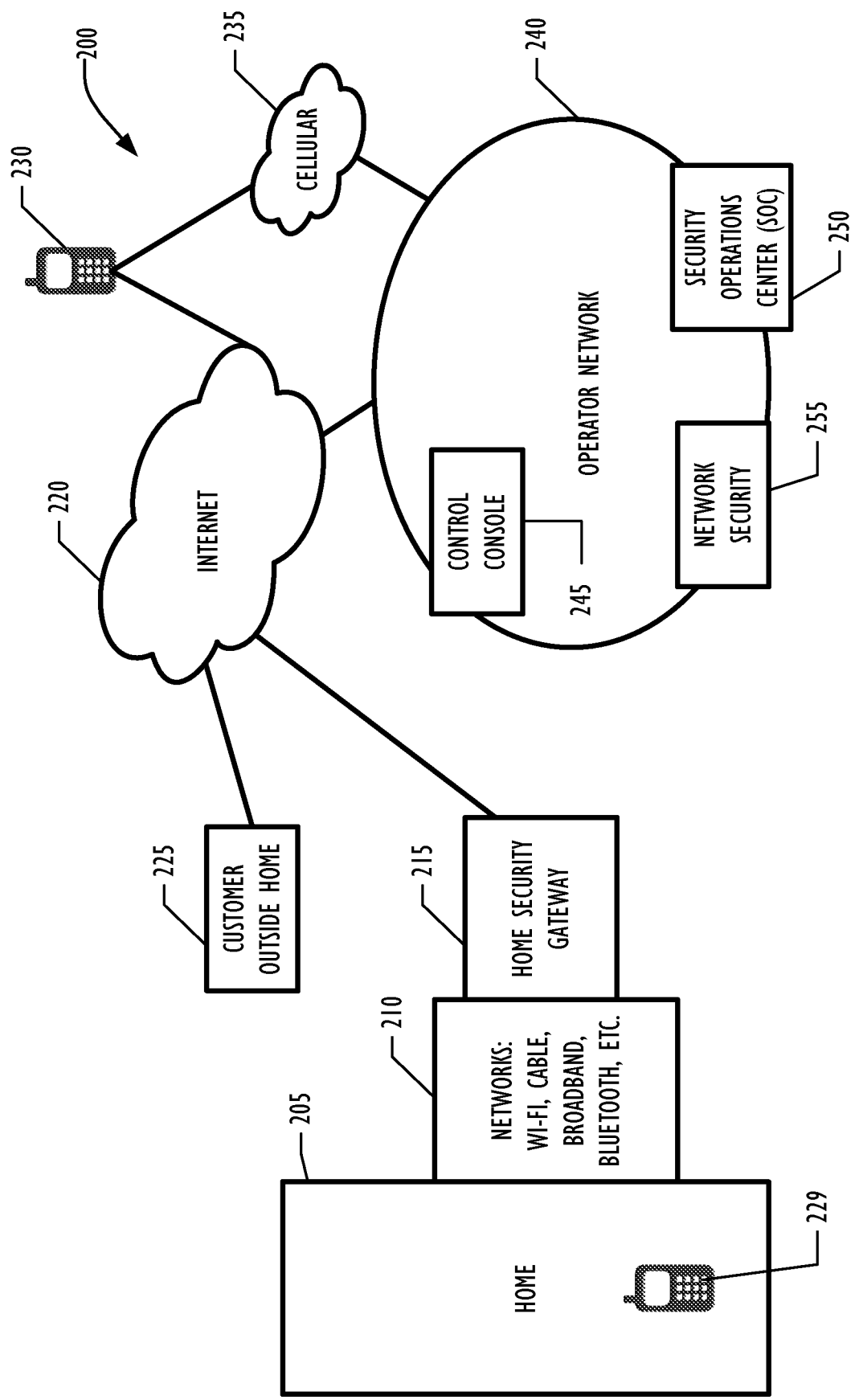
FIG. 2 is a block diagram illustrating a Home Security Gateway (HSG) configured to protect a home network according to one or more disclosed embodiments.

Referring now to FIG. 2 and network diagram 200, Home 205 contains a plurality of networks 210 and is configured with a Home Security Gateway (HSG) 215 according to the one or more disclosed embodiments. As will be explained in more detail below, HSG 215 attempts to protect the home network (not shown) inside home 205 in a variety of ways. HSG 215 can be installed "in-line" such that any device from the home network can only communicate to the Internet 220 by sending communication through HSG 215. Alternatively, HSG 215 can be installed as a Wi-Fi network device that monitors other connected devices without being directly in-line with Internet communication. HSG 215 communicates via the Internet 220 to provide an interface to an authorized user; for example, the customer/home owner outside of their home 225 can communicate with control console 245 to receive comprehensive information about and from a registered HSG 215 (i.e., their HSG 215 at home). Customers can alternatively use a smart phone device 230 to communicate with control console 245 via a cellular network 235 or Internet 220. That is the alerts and interactions described below concerning the subscriber can be communicated directly to a subscriber using a cellular network such that a subscriber can be alerted/contacted even when they are not connected to the Internet 220. When the customer is at home with their smart phone (indicated by reference element 229) they can have access to HSG 215 and subscriber applications via a plurality of networks not available when outside the home. HSG 215 can also communicate with an operator network 240 to report status and receive configuration updates (described in more detail below). Operator Network 240 can include a control console 245, a security operations center (SOC) 250, and a network security function 255. There can also be a proprietary communication protocol between an HSG 215 and a Network Security Platform (NSP) or SOC 250. This can allow operators to deliver comprehensive security for their customers. For example, if the same phone is connected via Wi-Fi and visible to HSG 215 and is then connected via a cellular network 235 (not visible to HSG 215) then the operator could be able to correlate that particular phone and its two different connection types. Similarly a car dashboard can connect via a cellular network which is visible to NSP and not to HSG 215. Operators and service providers can then produce reports for a customer irrespective of whether the devices were monitored by HSG 215 (when at home) or via Network Security Platform (NSP) (when roaming) This can be useful in scenarios where a $3^{rd}$ party (e.g., a network provider) is configured to deliver a comprehensive managed security service to home users. The network operator can then protect the home network using HSG, and roaming devices (like car, phones) using a network security device. Then the $3^{rd}$ party can combine events from both HSG and Network Security device for generating different types of monthly security reports for the customer (e.g., subscriber).

Figure 3:
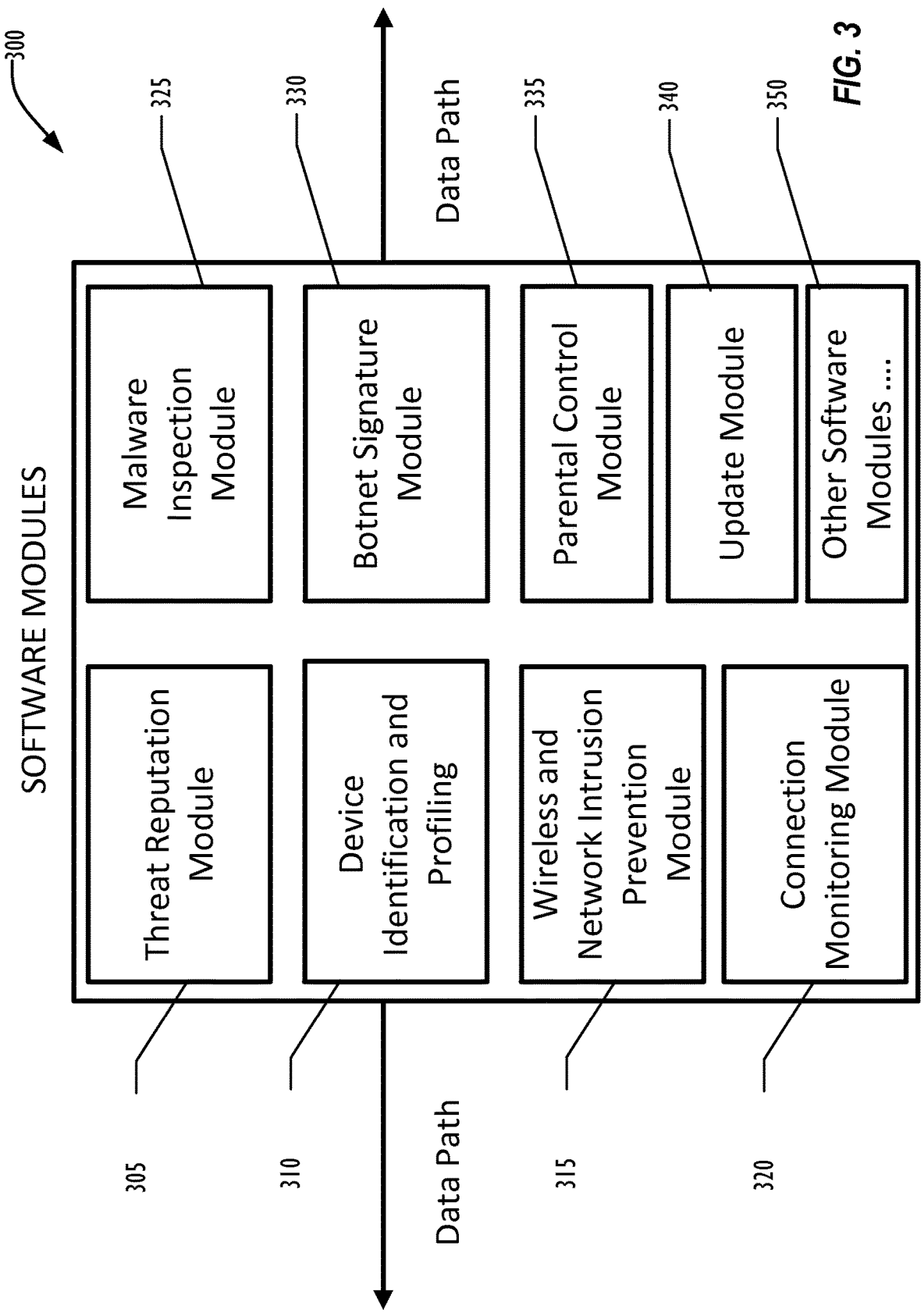
FIG. 3 is a block diagram illustrating different functional modules to support the one or more disclosed embodiments.

FIG. 3 illustrates in block diagram 300 some possible functional modules that could be included in HSG 215. These functional modules are merely examples and other functional modules of modules performing combined functions are possible within the scope of this disclosure. HSG 215 could include and be configured to execute a threat reputation module (305). The threat reputation module (305) can be configured to work by default with a configuration option for being disabled or to adjust the blocking sensitivity. The threat reputation module (305) can block access to Uniform Resource Locators (URLs) that have a bad reputation and can block access to certain Internet Protocol (IP) addresses when configured in-line. Alternatively, when HSG 215 is configured as only a Wi-Fi monitoring device, the threat reputation module (315) can raise an event and alert the subscriber via control console 245 and the user's application interface. Reputation information can be obtained by accessing a reputation server available on the Internet 220 or in operator network 245 for example.

HSG 215 can also be configured with a device identification and profiling module (310). The device identification and profiling module (310) can be enabled and work by default with a configuration option to disable active fingerprinting. Periodic fingerprinting information can be obtained from SOC 250. The device identification and profiling module (310) can gather information passively about connected devices to determine their identity, configuration and capabilities or can query a connected device to gather this type of information. Devices that have previously connected to the network protected by HSG 215 can be remembered when they reconnect and information about that device can be updated. Knowing which devices are connected to the network can allow HSG 215 to ensure that each connected device is maintained with properly installed and up to date endpoint protection software.

HSG 215 can also be configured with a wireless and network intrusion prevention module (315). The wireless network intrusion prevention module (315) can be configured to detect attempts to access the network from unauthenticated and unrecognized devices. Upon detection of a new device connection (or attempted connection) to the network, the subscriber can be alerted via the subscriber application and can either allow or block the devices connection. Optionally, new devices can be allowed to connect and the subscriber via the subscriber application can later force the new device to be disconnected from the network if desired. The intrusion prevention module (315) can also maintain information regarding device connectivity to facilitate reporting capabilities for the subscriber.

HSG 215 can also be configured with a malware inspection module (325), a botnet signature module (330), a connection monitoring module (320), an update module (340), a parental control module (335), and/or other software modules (350). Each of these modules performs its corresponding functions to assist in protecting the subscriber's network. In particular, the parental control module can allow a subscriber to maintain parental controls via the subscriber interface remotely. Parental controls can include day/time rules regarding access to Internet sites and to social media sites. For example, a subscriber could configure HSG 215 to prevent access to social media sites or email during certain hours of the day, days of the week, or a combination thereof etc. for a particular userid (either on the network or on the social media application). If an exceptional situation arises the subscriber could configure HSG 215 to allow an otherwise blocked connection from a remote location via the subscriber interface application.

Figure 4:
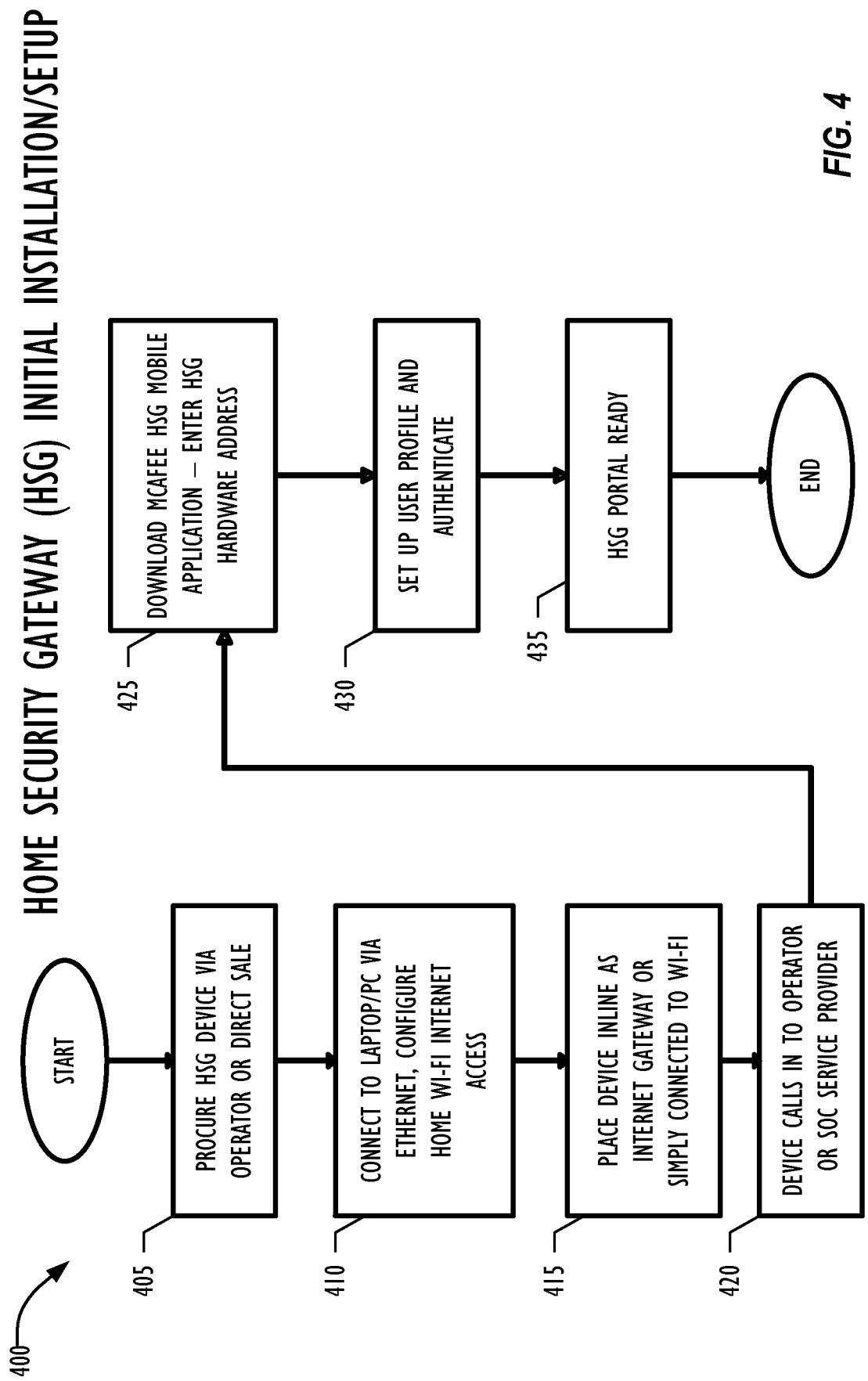
FIG. 4 is a flow chart illustrating a possible configuration process for initial setup of an HSG according to one or more disclosed embodiments.

FIG. 4 illustrates flow chart 400 which is an example process to initially configure an HSG 215 device. Beginning at block 405, a consumer procures an HSG 215 from the consumer marketplace or directly from an operator. In the context of this disclosure an operator provides a service to the consumer in a similar manner that a cellular provider provides service to a cell phone owner. As with cell phones, an HSG 215 could be tied to a particular service provider (i.e., operator). Alternatively, HSG 215 could be configured such that it could be compatible for use with multiple service providers and the different service providers could provide competitive subscription contracts allowing a purchaser to change their service provider over time. Once procured, HSG 215 is connected to a computer and configured with necessary parameters to configure Internet and Wi-Fi access (block 410) in a very similar manner as is conventionally done for cable/DSL routes and modems. At block 415, HSG 215 can be connected to the network either as a peer network device or as an in-line gateway between the network and the Internet. Once connected to the Internet, HSG 215 can connect to appropriate operator or SOC service provider (block 420). At block 425, the HSG 215 has connected to the service provider and the subscriber can download an appropriate mobile device application or otherwise connect to a control console 245 at the operator network 240. Upon entry of a device identification of the purchased HSG 215 the user (e.g., subscriber) can be correlated with the HSG 215 that connected at block 420. At block 430 the subscriber can complete the setup of their user profile and the HSG 215 is configured for default settings and ready for use (block 435).

Figure 5:
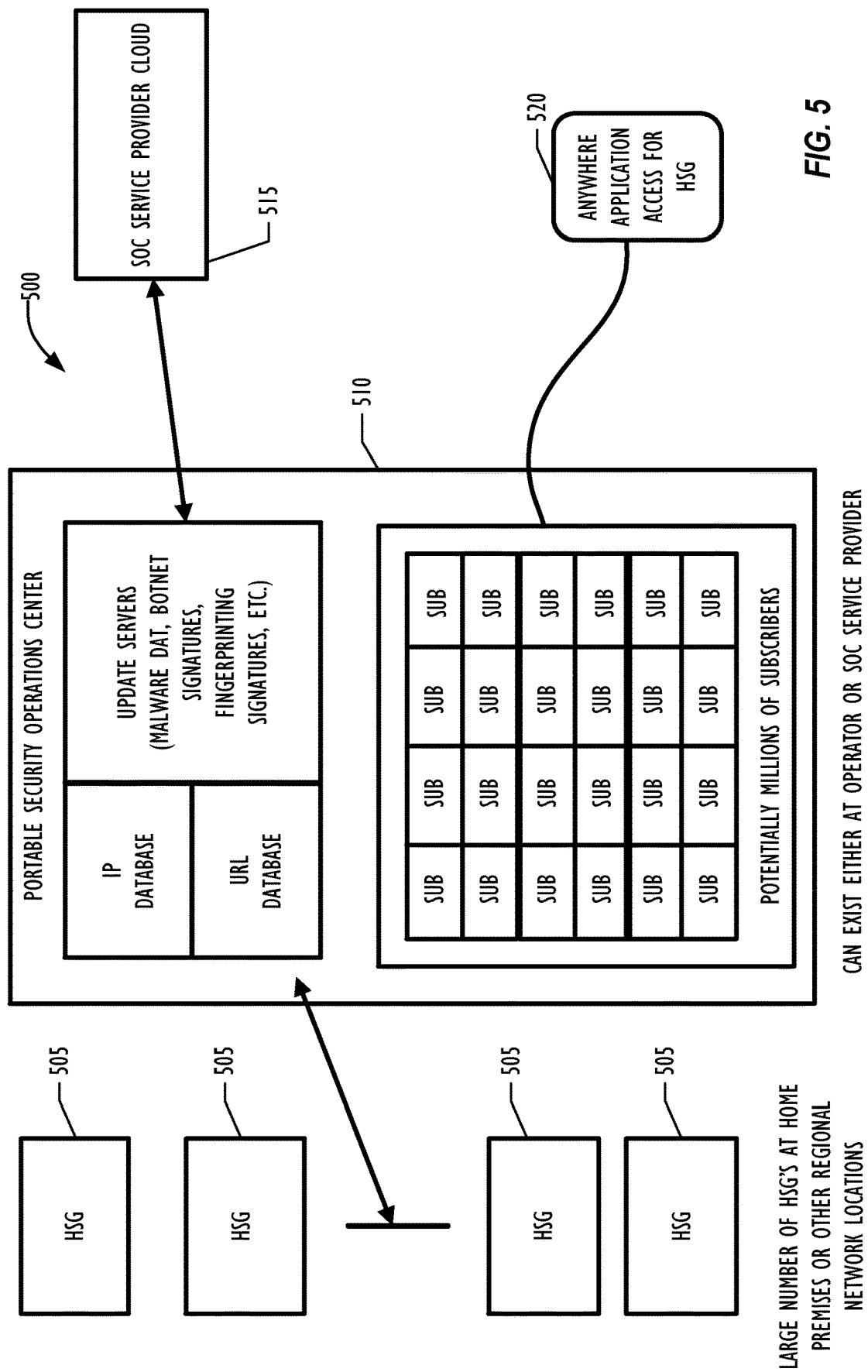
FIG. 5 is a block diagram illustrating a portable security operations center configured to support a plurality of HSG devices.

Referring now to FIG. 5, block diagram 500 illustrates how a large number of individual HSGs 505 can be managed from a portable security operations center 510. In this example, HSGs 505 communicate with portable security operations center 510 and individually register as a device subscriber. Each one of HSGs 505 can have a corresponding secure partition to maintain configuration information at the Portable SOC 510. Portable SOC 510 can provide updates and information to each of HSGs 505 as needed. For example, an HSG can report the types of devices connected at its corresponding network and obtain proper endpoint security updates for endpoint devices that are not current. Alternatively, an HSG can receive updates regarding suspect IP addresses or URLs via a query to the portable SOC 510 and can receive periodic updates for information maintained locally at the HSG. Portable SOC 510 is designated as "portable" because it can either exist at an operator or at a third party SOC service provider as necessary. Additionally, for functions not performed directly at portable SOC 510, portable SOC 510 can communicate with an SOC service provider in the cloud 515. End users (e.g., subscribers) can access 520 information pertinent to their particular HSG by accessing information maintained at the portable SOC 510. Access can be via the subscriber application or by using a standard web browser to connect to the service provider's web interface. In some cases it may be possible for a subscriber to connect directly to their HSG, for example, using portable SOC 510 as a bridge type device or a portal.

FIG. 6 illustrates a block diagram 600 showing a mockup of potential user interface screens for the above described subscriber application. Screen mockup 605 illustrates an authentication screen to allow entry of a hardware address for a particular HSG to facilitate correlation of an end user with their network in a secure manner. Screen mockup 610 illustrates an informational screen that can be shown after authentication to provide an overview of information that the corresponding HSG knows about its network. Screen mockup 610 additionally illustrates selection buttons to allow access to some of the HSG modules discussed above. Screen mockup 615 illustrates more detail (e.g., show devices) about devices existing on a monitored network.

Figure 7:
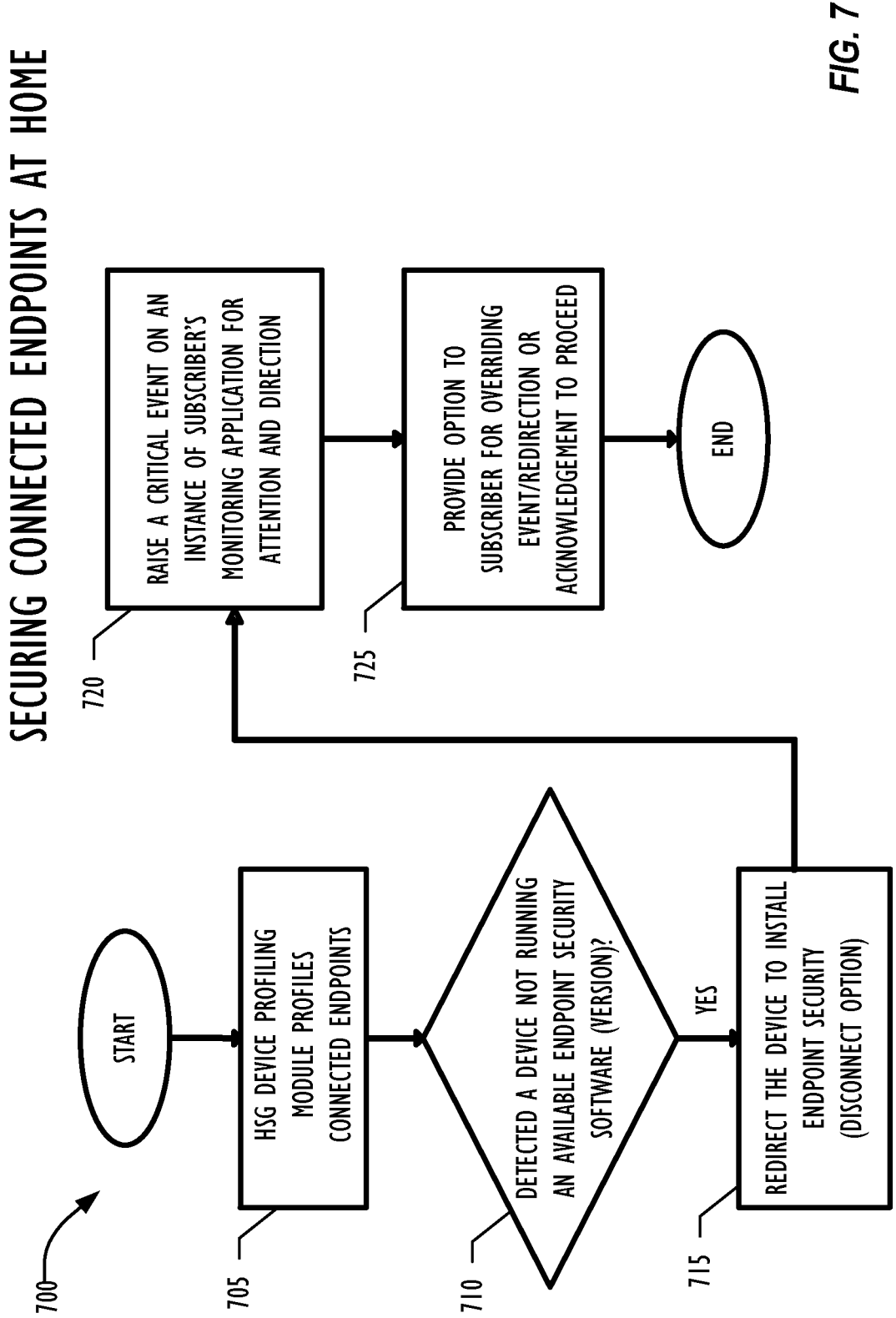
FIG. 7 is a flow chart illustrating a process for securing endpoints at a home containing an HSG according to one or more disclosed embodiments.

FIG. 7 illustrates a flow chart 700 to secure a connected endpoint at a home or regional network. Beginning at block 705 the device profiling module identifies and profiles as many devices as possible that are connected to the same network as an HSG. If a detected device can be identified it can likely be interrogated in some manner to determine if it is running endpoint security software and, if it is, to determine the version of software it is executing. If at block 710 a detected device is determined to not be correctly configured with its endpoint security software, HSG 215 can redirect the device to cause it to install an updated version of endpoint security software, send an appropriate alert to a subscriber application, or optionally disconnect the not properly protected device (block 715). At block 720 a critical event can be presented in an instance of the appropriate subscriber's application interface. At block 725 the subscriber can be presented an option to override the event and/or redirection or acknowledge that the redirection should proceed.

Figure 8:
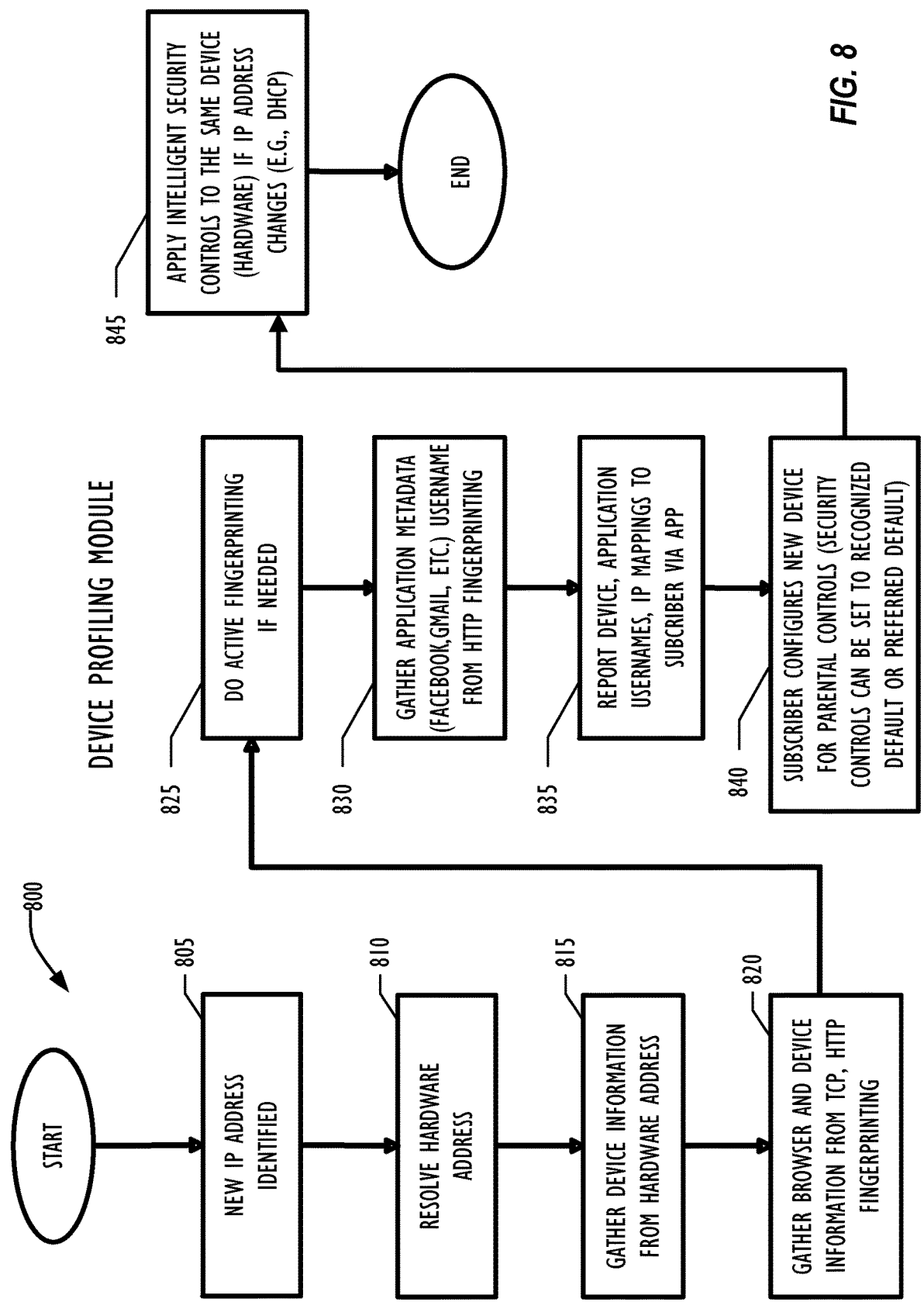
FIG. 8 is a flow chart illustrating a process for device profiling of endpoint devices according to one or more disclosed embodiments.

FIG. 8 illustrates flow chart 800 showing one possible process implemented by the device profiling module of an HSG 215. Beginning at block 805 an HSG 215 configured to monitor a network identifies a new IP address active on the network. The new IP address is possibly, but not necessarily, associated with a new device connecting to the network. In some cases a previously identified device can be reconnecting and have a different address because of dynamic host connection protocol (DHCP) or could have been re-configured to have a different static IP address. It is also possible that a previously identified device has more than one network access card connected to the network and therefore has an IP address for each connected network card. After a new IP address is identified, HSG 215 can attempt to resolve the IP address down to a hardware address (block 810). As is understood in the art, hardware addresses do not change over time for a network access card. In some cases however, a particular network access card can be moved from one device to another so simply resolving to the hardware address of the network card may not be sufficient to definitively identify a particular device over time. Next at block 815, the device profiling module can gather information from the device at the identified new IP address. Using all available information HSG 215 can attempt to determine if this is the first time the device has been connected to the network or if this is a known device reconnecting. Obviously, if a known device is reconnecting a different process for profiling can be used than if a new device is connecting for the very first time. At block 820 information can be gathered from the device using such techniques as transmission control protocol (TCP) or hypertext transport protocol (HTTP) fingerprinting. HSG 215 can use passive monitoring to gather information for fingerprinting devices or can use active fingerprinting if needed (block 825). Passive information gathering refers to monitoring network transmissions concerning the device and active fingerprinting refers to direct interaction with the device to query or probe for information. At block 830 the device profiling module can gather application metadata from the device such as a username for a social media account or an email identification related to an email client on the device being profiled. Knowing particular user information can also be useful to other modules of HSG 215 such as the parental control module. At block 835 a report containing information gathered by profiling can be sent to the subscriber application described above so that the subscriber will be informed of details of the newly connecting device. Obviously if it is determined that a previously known device is reconnecting the subscriber may optionally not be alerted. At block 840 the subscriber can use the provided information to optionally configure parental controls and any other desired configuration parameters regarding how HSG 215 should interact with the device. Finally, block 845 illustrates that HSG 215 can transfer previous configuration parameters from a previously known and previously configured device in the event it is determined that the new IP address belongs to a device that has simply had a change in IP address.

Figure 9:
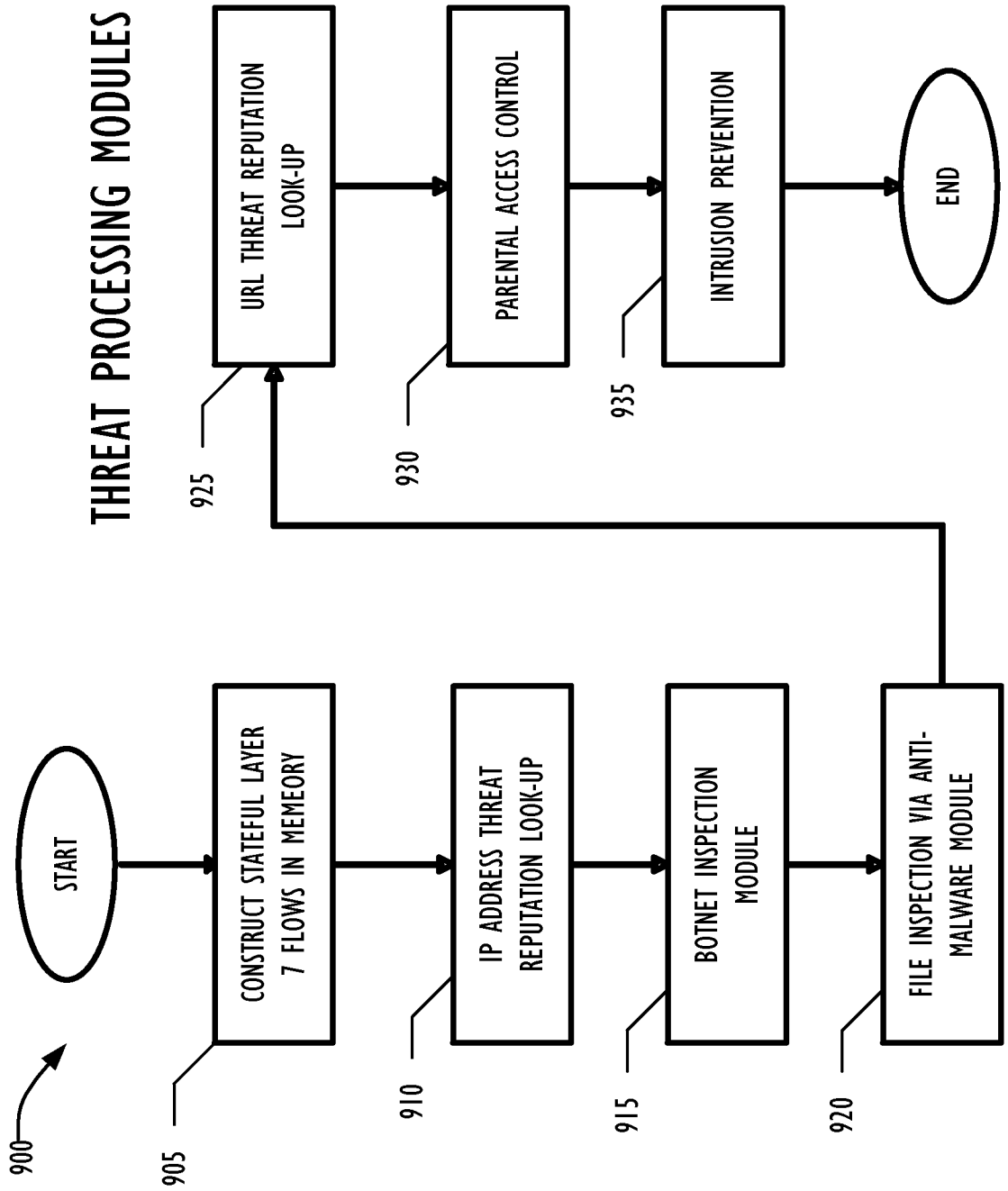
FIG. 9 is a flow chart illustrating a process for threat processing according to one or more disclosed embodiments.

Referring now to FIG. 9, flow chart 900 illustrates one possible process implemented by the threat processing module(s) of an HSG 215. Beginning at block 905, HSG 215 can process a TCP/UDP stream and de-fragment it to construct stateful Layer 7 flows in memory. Internet Protocol transmission, by it very design, allows for a very large degree of flexibility regarding payload transmission (e.g., from a server to a client). For example, a server sending 1000 bytes of payload may in an extreme case send it in 1000 packets, each containing 1 byte of payload (user data). Also, the IP packets may get fragmented along the path from the server to the client. Though it is not seen frequently in reality, when this occurs the situation is almost always an indication of transmission for malicious purposes. One suitable term for this is "evasion/obfuscation". Accordingly, HSG 215 can be configured to normalize all the evasions/obfuscations in a packet stream as an initial step. Once a packet stream has been normalized (if necessary), at block 910 an IP address involved in communication with a device on the protected network can be checked for its reputation. Typically this would involve HSG 215 capturing the IP address and querying a reputation server on the Internet or via the portable SOC 510 for a reputation/risk rating of the IP address. If the rating indicates that a risk is over a threshold the communication from the suspect IP address can be blocked (in-line configuration mode) and/or the subscriber can be alerted via subscriber application. Block 915 illustrates that HSG 215 can perform botnet inspection of traffic coming to the protected network. Botnets include a network of private computers infected with malicious software and controlled as a group without the owners' knowledge, e.g., to send spam messages. Block 920 illustrates that HSG 215 can perform file inspection for malware on files being downloaded to the protected network and similarly take corrective action (e.g., block download, alert to subscriber, etc.). Block 925 illustrates that HSG 215 can perform URL reputation services in a similar manner to IP reputation services described for block 910. Block 930 illustrates that the threat processing modules can work with and take into consideration configuration information provided by parental access control modules of the HSG 215. Finally, block 935 illustrates that HSG 215 can provide intrusion prevention protection as described above.

In summary, an HSG 215 configured according to the one or more disclosed embodiments could provide enterprise grade security for a home or regional network. The protected home network could benefit from a service provided by trained professionals at a portable SOC 510 to provide a level of service to the average home owner that would not be available without a device configured such as HSG 215. HSG 215 can facilitate cloud based management of itself and the network it protects via the above described user application. HSG 215 can support proactive endpoint software upgrades to ensure that all endpoints are protected to the discretion of the subscriber. If desired HSG 215 can assist protecting endpoints by redirecting them to distribution points for the necessary endpoint protection software. HSG 215 also can provide comprehensive auditing and reporting information for a subscriber so that the subscriber can have an accurate picture of all devices connected to a network. Identified devices can be included in the report with particular details as determined by a device profiling module. HSG 215 can also provide intrusion protection alerts and simple notifications when new devices attempt to connect to a protected network. The described subscriber application can include a single button to shut down the entire home network in an emergency situation or can receive a single request to disable network access for a particular device.

In one use case a subscriber with a properly configured HSG 215 protecting his home network could determine that unauthorized network devices are attempting to connect to his home network. For example, if a burglar breaks into the home and has a cell phone that is set to automatically attempt to connect to the network the home owner (subscriber) would get an alert on his mobile application via the subscriber application. In this use case the subscriber could configure HSG 215 to protect a network that is identified as an "unsecured" network because it does not require a password for connection. However, the HSG 215 can be configured to only allow connection to the network based on an acknowledgement from the subscriber application. In this manner any device can easily connect to the network with the explicit authorization of the subscriber with needing to enter a network password. In another example, the "unsecured" network configuration would also be helpful when guests come over and request access to the home wireless network. A subscriber can allow them to connect while they are visiting and not have to inform them of any network password. Many other variations and use cases will become apparent to those of skill in the art given the benefit of this disclosure.

Figure 10:
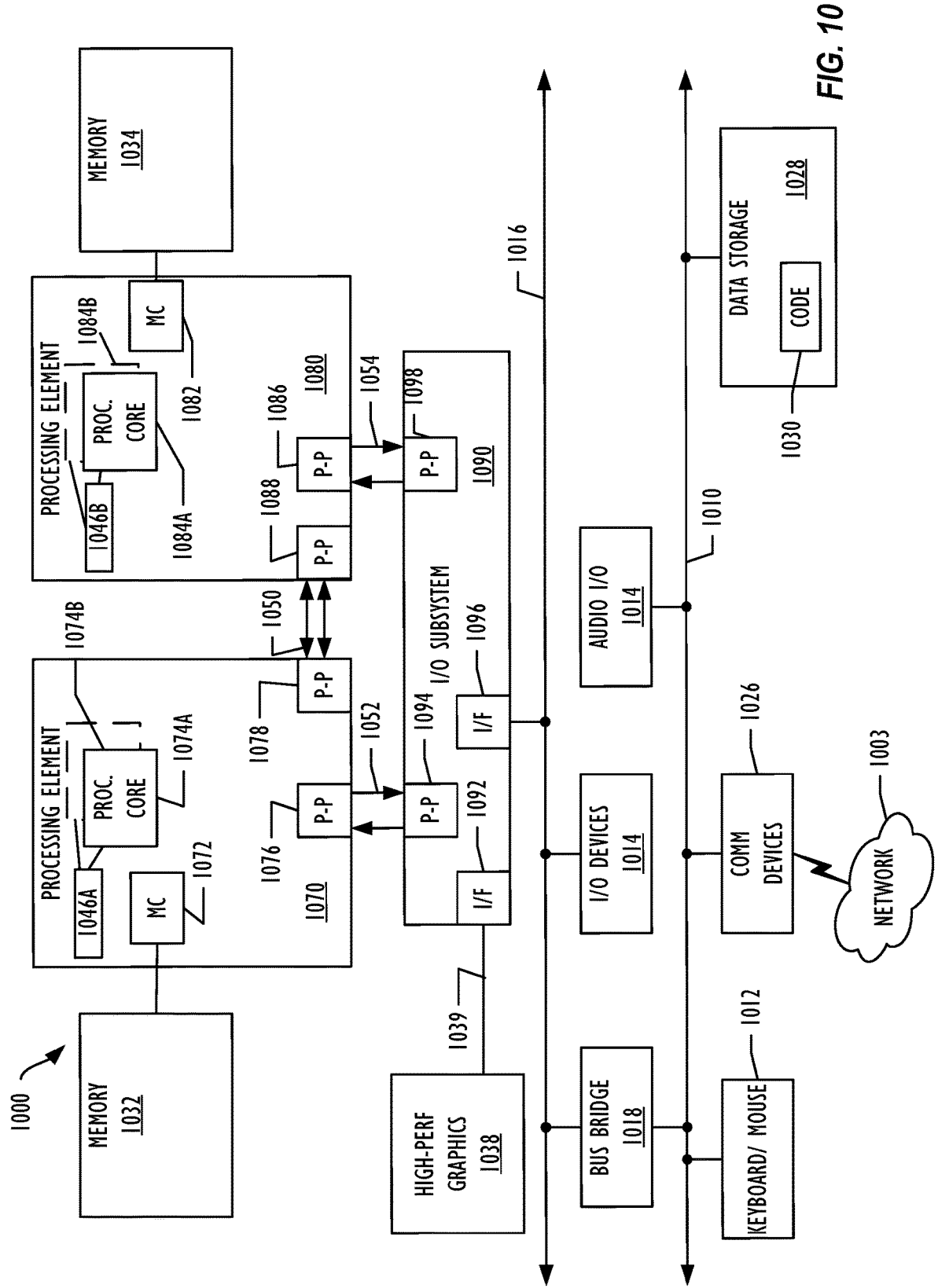
FIG. 10 is a block diagram illustrating a programmable device for use with techniques described herein according to one embodiment.

Referring now to FIG. 10, a block diagram illustrates a programmable device 1000 that may be used within an HSG 215 in accordance with one embodiment. The programmable device illustrated in FIG. 10 is a multiprocessor programmable device 1000 that includes a first processing element 1070 and a second processing element 1080. While two processing elements 1070 and 1080 are shown, an embodiment of programmable device 1000 may also include only one such processing element.

Programmable device 1000 is illustrated as a point-to-point interconnect system, in which the first processing element 1070 and second processing element 1080 are coupled via a point-to-point interconnect 1050. Any or all of the interconnects illustrated in FIG. 10 may be implemented as multi-drop bus rather than point-to-point interconnects.

As illustrated in FIG. 10, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIGS. 1-9. However, other embodiments may use processing elements that are single core processors as desired. In embodiments with multiple processing elements 1070, 1080, each processing element may be implemented with different numbers of cores as desired.

Each processing element 1070, 1080 may include at least one shared cache 1046. The shared cache 1046a, 1046b may store data (e.g., instructions) that are utilized by one or more components of the processing element, such as the cores 1074a, 1074b and 1084a, 1084b, respectively. For example, the shared cache may locally cache data stored in a memory 1032, 1034 for faster access by components of the processing elements 1070, 1080. In one or more embodiments, the shared cache 1046a, 1046b may include one or more mid-level caches, such as level 2 (L2), level 3 (L3), level 4 (L4), or other levels of cache, a last level cache (LLC), or combinations thereof.

While FIG. 10 illustrates a programmable device with two processing elements 1070, 1080 for clarity of the drawing, the scope of the present invention is not so limited and any number of processing elements may be present. Alternatively, one or more of processing elements 1070, 1080 may be an element other than a processor, such as an graphics processing unit (GPU), a digital signal processing (DSP) unit, a field programmable gate array, or any other programmable processing element. Processing element 1080 may be heterogeneous or asymmetric to processing element 1070. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. In some embodiments, the various processing elements 1070, 1080 may reside in the same die package.

First processing element 1070 may further include memory controller logic (MC) 1072 and point-to-point (P-P) interconnects 1076 and 1078. Similarly, second processing element 1080 may include a MC 1082 and P-P interconnects 1086 and 1088. As illustrated in FIG. 10, MCs 1072 and 1082 couple the processing elements 1070, 1080 to respective memories, namely a memory 1032 and a memory 1034, which may be portions of main memory locally attached to the respective processors. While MC logic 1072 and 1082 is illustrated as integrated into the processing elements 1070, 1080, in some embodiments the MC logic may be discrete logic outside the processing elements 1070, 1080 rather than integrated therein.

Processing element 1070 and processing element 1080 may be coupled to an I/O subsystem 1090 via P-P interconnects 1076, 1086 and 1084, respectively. As illustrated in FIG. 10, I/O subsystem 1090 includes P-P interconnects 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first link 1016 via an interface 1096. In one embodiment, first link 1016 may be a Peripheral Component Interconnect (PCI) bus, or a bus such as a PCI Express bus or another I/O interconnect bus, although the scope of the present invention is not so limited.

As illustrated in FIG. 10, various I/O devices 1014 may be coupled to first link 1016, along with a bridge 1018 which may couple first link 1016 to a second link 1010. In one embodiment, second link 1020 may be a low pin count (LPC) bus. Various devices may be coupled to second link 1020 including, for example, a keyboard/mouse 1012, communication device(s) 1026 (which may in turn be in communication with the computer network 1003), and a data storage unit 1028 such as a disk drive or other mass storage device which may include code 1030, in one embodiment. The code 1030 may include instructions for performing embodiments of one or more of the techniques described above. Further, an audio I/O 1024 may be coupled to second bus 1020.

Note that other embodiments are contemplated. For example, instead of the point-to-point architecture of FIG. 10, a system may implement a multi-drop bus or another such communication topology. Although links 1016 and 1020 are illustrated as busses in FIG. 10, any desired type of link can be used. Also, the elements of FIG. 10 may alternatively be partitioned using more or fewer integrated chips than illustrated in FIG. 10.

Figure 11:
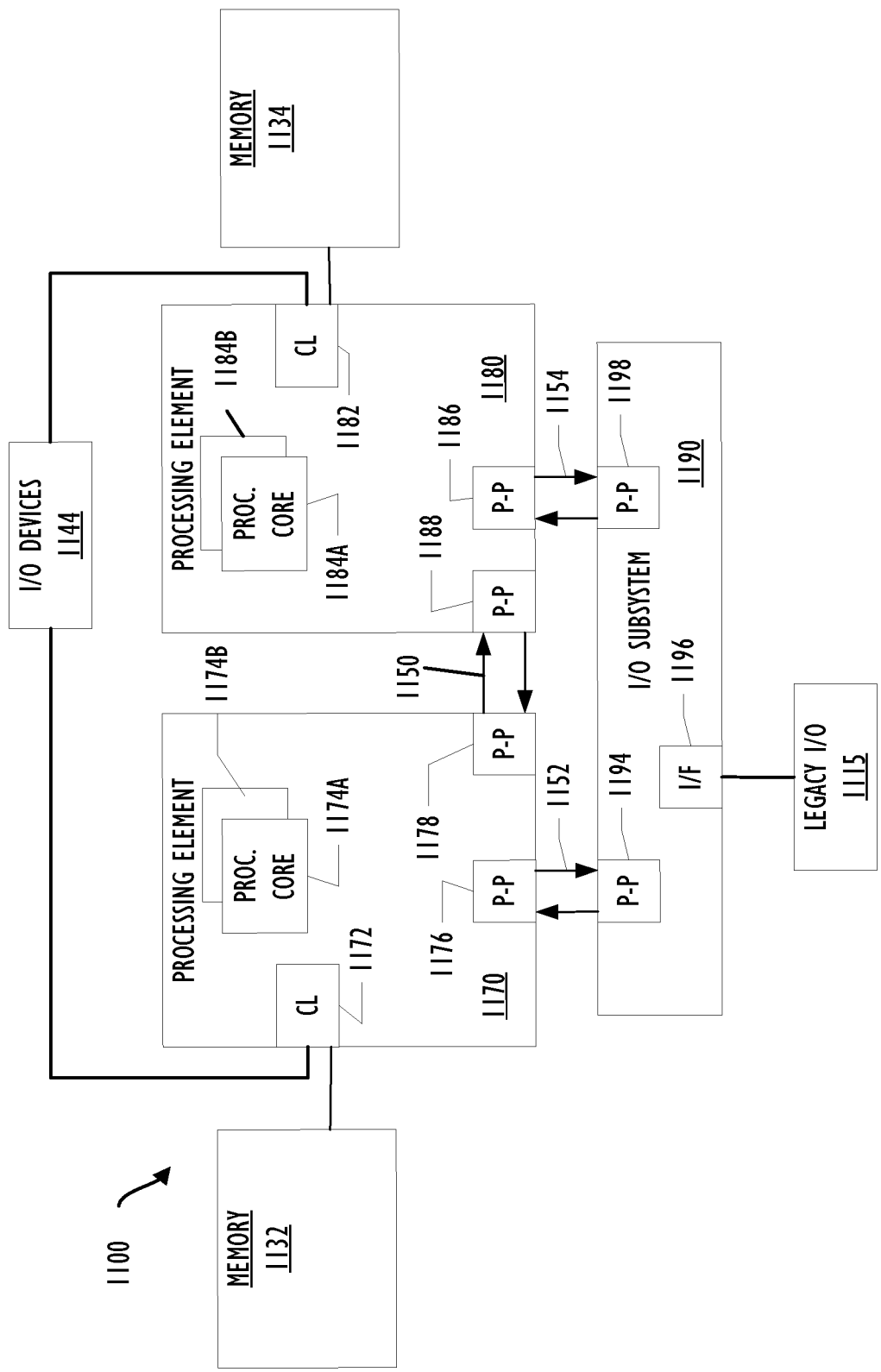
FIG. 11 is a block diagram illustrating a programmable device for use with techniques described herein according to another embodiment.

Referring now to FIG. 11, a block diagram illustrates a programmable device 1100 according to another embodiment. Certain aspects of FIG. 10 have been omitted from FIG. 11 in order to avoid obscuring other aspects of FIG. 11.

FIG. 11 illustrates that processing elements 1170, 1180 may include integrated memory and I/O control logic ("CL") 1172 and 1182, respectively. In some embodiments, the CL 1172, 1182 may include memory control logic (MC) such as that described above in connection with FIG. 10. In addition, CL 1172, 1182 may also include I/O control logic. FIG. 11 illustrates that not only may the memories 1132, 1134 be coupled to the CL 1172, 1182, but also that I/O devices 1114 may also be coupled to the control logic 1172, 1182. Legacy I/O devices 1115 may be coupled to the I/O subsystem 1190.

The programmable devices depicted in FIGS. 10 and 11 are schematic illustrations of embodiments of programmable devices which may be utilized to implement various embodiments discussed herein. It will be appreciated that various components of the programmable devices depicted in FIGS. 10 and 11 may be combined in a system-on-a-chip (SoC) architecture.

Figure 12:
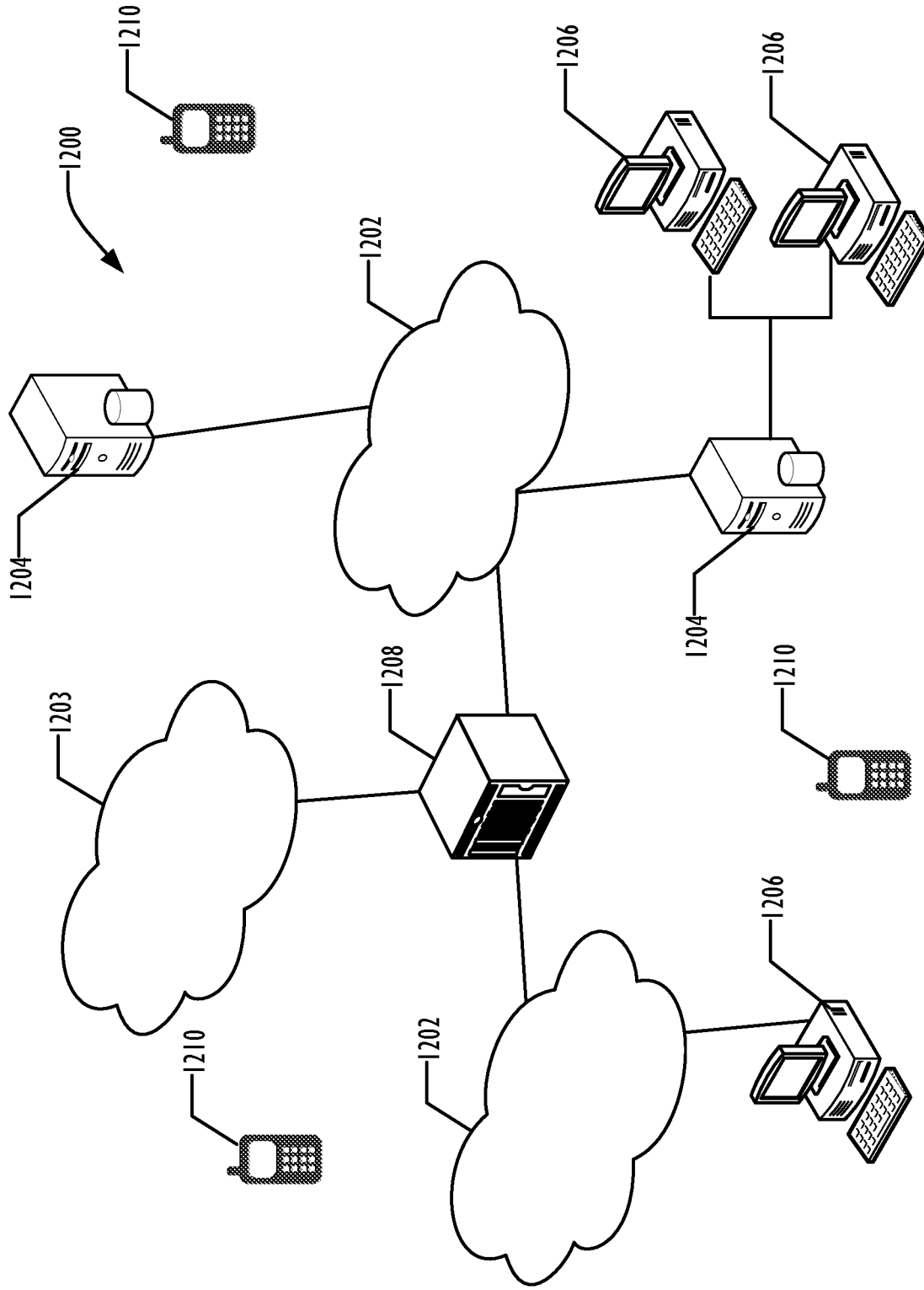
FIG. 12 is a block diagram illustrating a network of programmable devices in which the techniques described herein may be implemented.

Referring now to FIG. 12, an example infrastructure 1200 is illustrated schematically. Infrastructure 1200 contains computer networks 1202. Computer networks 1202 may include many different types of computer networks available today, such as the Internet, a corporate network, or a Local Area Network (LAN). Each of these networks can contain wired or wireless devices and operate using any number of network protocols (e.g., TCP/IP). Networks 1202 may be connected to gateways and routers (represented by 1208), end user computers 1206, and computer servers 1204. Infrastructure 1200 also includes cellular network 1203 for use with mobile communication devices. Mobile cellular networks support mobile phones and many other types of devices (e.g., tablet computers, not shown). Mobile devices in the infrastructure 1200 are illustrated as mobile phones 1210.

In an infrastructure such as that illustrated in FIG. 12, systems that employ HSG protected networks may be connected to any of the various networks 1202 or 1203. These systems may include any type of network connected device, including mobile devices 1210 and embedded programmable devices (not shown). Thus the techniques described above may be used with a wide variety of devices.

The following is a non-exhaustive list of potential embodiments: Example 1 is a machine readable medium on which are stored instructions, comprising instructions that when executed by a programmable device, cause the programmable device to: monitor for a connection attempt by a first device to connect to a first network; identify the first device has not previously connected to the first network; initiate a communication to a subscriber device via a second network, the communication comprising information about the first device and requesting authorization to allow connection of the first device; receive a response initiated from the subscriber device authorizing connection; and allow connection of the first device to the first network based on the response. Example 2 is a machine-readable medium of example 1, wherein the second network comprises a cellular network. Example 3 is a machine-readable medium of example 1, wherein the first network and the second network are not in direct communication with each other. Example 4 is a machine-readable medium of example 1, wherein the first network and second network are each in communication with an operator network. Example 5 is a machine-readable medium of example 1, wherein the first network is not protected with a network password. Example 6 is a machine-readable medium of example 1, further comprising instructions that when executed by the programmable device, cause the programmable device to: profile the first device after connection to the first network to determine attributes of the first device. Example 7 is a machine-readable medium of example 1, further comprising instructions that when executed by the programmable device, cause the programmable device to: perform network protection functions for the first network, the network protection functions including one or more of: threat reputation protection, botnet protection, malware protection, parental control protection, and intrusion prevention. Example 8 is a machine-readable medium of example 1, further comprising instructions that when executed by the programmable device, cause the programmable device to: establish a secure communication connection to an operator network and provide information about a plurality of devices connected to the first network to a device at the operator network, the information comprising endpoint security configurations for each of the plurality of devices connected to the first network. Example 9 is a machine-readable medium of example 8, further comprising instructions that when executed by the programmable device, cause the programmable device to: receive via the secure communication connection to the operator network information pertaining to available updates of endpoint security configurations for one or more of the plurality of devices connected to the first network; and initiate a second communication to the subscriber device comprising information about the available updates. Example 10 is a machine-readable medium of example 9, further comprising instructions that when executed by the programmable device, cause the programmable device to:

receive a second response to the second communication, the second response indicating an update request for one or more of the plurality of devices connected to the first network; and initiating an update of the endpoint security configuration corresponding to updates identified in the second response. Example 11 is a The machine-readable medium of example 9, wherein the first network comprises a wireless network selected from the group consisting of: a home wireless network, a small office wireless network, and a wireless network supporting a group or organization. Example 12 is a machine-readable medium on which are stored instructions, comprising instructions that when executed by a programmable device, cause the programmable device to: monitor to detect a plurality of devices connected to a first network; identify attributes of the plurality of devices using passive network monitoring techniques; probe a first of the plurality of devices using an active fingerprinting technique; initiate a communication via a secure communication connection to an operator network, the communication comprising information about the first device and requesting information concerning available updates for the first device; initiate a second communication to a subscriber device comprising information about the available updates, the subscriber device known to the operator network to be associated with the first network; receive, via the secure communication connection to the operator network, information pertaining to an authorization from the subscriber device to apply one or more of the available updates; and initiate an update of the first device corresponding to the authorization. Example 13 is a system for monitoring connections and connection attempts to a first network, comprising: a processor; a network interface connected to the first network; a memory, coupled to the processor; and executable instructions, stored on the memory, comprising instructions that when executed by the processor cause the processor to: monitor for a connection attempt by a first device to connect to a first network; identify the first device has not previously connected to the first network; initiate a communication to a subscriber device via a second network, the communication comprising information about the first device and requesting authorization to allow connection of the first device; receive a response initiated from the subscriber device authorizing connection; and allow connection of the first device to the first network based on the response. Example 14 is a system of example 13, wherein the second network comprises a cellular network. Example 15 is a system of example 13, wherein the first network and the second network are not in direct communication with each other. Example 16 is a system of example 13, wherein the first network and second network are each in communication with an operator network. Example 17 is a system of example 13, wherein the first network is not protected with a network password. Example 18 is a system of example 13, further comprising executable instructions that when executed by the processor, cause the processor to: profile the first device after connection to the first network to determine attributes of the first device. Example 19 is a system of example 13, further comprising executable instructions that when executed by the processor, cause the processor to: perform network protection functions for the first network, the network protection functions including one or more of: threat reputation protection, botnet protection, malware protection, parental control protection, and intrusion prevention. Example 20 is a system of example 13, further comprising executable instructions that when executed by the processor, cause the processor to: establish a secure communication connection to an operator network and provide information about a plurality of devices connected to the first network to a device at the operator network, the information comprising endpoint security configurations for each of the plurality of devices connected to the first network. Example 21 is a system of example 20, further comprising executable instructions that when executed by the processor, cause the processor to: receive via the secure communication connection to the operator network information pertaining to available updates of endpoint security configurations for one or more of the plurality of devices connected to the first network; and initiate a second communication to the subscriber device comprising information about the available updates. Example 22 is a system of example 21, further comprising executable instructions that when executed by the processor, cause the processor to: receive a second response to the second communication, the second response indicating an update request for one or more of the plurality of devices connected to the first network; and initiating an update of the endpoint security configuration corresponding to updates identified in the second response. Example 23 is a system of example 21, wherein the first network comprises a wireless network selected from the group consisting of: a home wireless network, a small office wireless network, and a wireless network supporting a group or organization. Example 24 is a system for monitoring a first network, comprising: a processor; a network interface connected to the first network; a memory, coupled to the processor; and executable instructions, stored on the memory, comprising instructions that when executed by the processor cause the processor to: monitor to detect a plurality of devices connected to a first network; identify attributes of the plurality of devices using passive network monitoring techniques; probe a first of the plurality of devices using an active fingerprinting technique; initiate a communication via a secure communication connection to an operator network, the communication comprising information about the first device and requesting information concerning available updates for the first device; initiate a second communication to a subscriber device comprising information about the available updates, the subscriber device known to the operator network to be associated with the first network; receive, via the secure communication connection to the operator network, information pertaining to an authorization from the subscriber device to apply one or more of the available updates; and initiate an update of the first device corresponding to the authorization. Example 25 is a machine-readable medium on which are stored instructions, comprising instructions that when executed by a programmable device, cause the programmable device to: monitor for a connection attempt by a first device to connect to a first network; identify the first device has not previously connected to the first network; initiate a communication to a subscriber device via a second network, the communication comprising information about the first device and requesting authorization to allow connection of the first device; receive a response initiated from the subscriber device authorizing connection; and allow connection of the first device to the first network based on the response. Example 26 is a The machine-readable medium of example 25, wherein the second network comprises a cellular network. Example 27 is a machine-readable medium of any of examples 25-26, wherein the first network and the second network are not in direct communication with each other. Example 28 is a machine-readable medium of any of examples 25-26, wherein the first network and second network are each in communication with an operator network. Example 29 is a machine-readable medium of any of examples 25-26, wherein the first network is not protected with a network password. Example 30 is a machine-readable medium of any of examples 25-26, further comprising instructions that when executed by the programmable device, cause the programmable device to: profile the first device after connection to the first network to determine attributes of the first device. Example 31 is a machine-readable medium of any of examples 25-26, further comprising instructions that when executed by the programmable device, cause the programmable device to: perform network protection functions for the first network, the network protection functions including one or more of: threat reputation protection, botnet protection, malware protection, parental control protection, and intrusion prevention. Example 32 is a machine-readable medium of any of examples 25, further comprising instructions that when executed by the programmable device, cause the programmable device to: establish a secure communication connection to an operator network and provide information about a plurality of devices connected to the first network to a device at the operator network, the information comprising endpoint security configurations for each of the plurality of devices connected to the first network. Example 33 is a machine-readable medium of example 32, further comprising instructions that when executed by the programmable device, cause the programmable device to: receive via the secure communication connection to the operator network information pertaining to available updates of endpoint security configurations for one or more of the plurality of devices connected to the first network; and initiate a second communication to the subscriber device comprising information about the available updates. Example 34 is a machine-readable medium of example 33, further comprising instructions that when executed by the programmable device, cause the programmable device to: receive a second response to the second communication, the second response indicating an update request for one or more of the plurality of devices connected to the first network; and initiating an update of the endpoint security configuration corresponding to updates identified in the second response. Example 35 is a machine-readable medium of example 33, wherein the first network comprises a wireless network selected from the group consisting of: a home wireless network, a small office wireless network, and a wireless network supporting a group or organization. Example 36 is a machine-readable medium on which are stored instructions, comprising instructions that when executed by a programmable device, cause the programmable device to: monitor to detect a plurality of devices connected to a first network; identify attributes of the plurality of devices using passive network monitoring techniques; probe a first of the plurality of devices using an active fingerprinting technique; initiate a communication via a secure communication connection to an operator network, the communication comprising information about the first device and requesting information concerning available updates for the first device; initiate a second communication to a subscriber device comprising information about the available updates, the subscriber device known to the operator network to be associated with the first network; receive, via the secure communication connection to the operator network, information pertaining to an authorization from the subscriber device to apply one or more of the available updates; and initiate an update of the first device corresponding to the authorization. Example 37 is a system for monitoring connections and connection attempts to a first network, comprising: a processor; a network interface connected to the first network; a memory, coupled to the processor; and executable instructions, stored on the memory, comprising instructions that when executed by the processor cause the processor to: monitor for a connection attempt by a first device to connect to a first network; identify the first device has not previously connected to the first network; initiate a communication to a subscriber device via a second network, the communication comprising information about the first device and requesting authorization to allow connection of the first device; receive a response initiated from the subscriber device authorizing connection; and allow connection of the first device to the first network based on the response. Example 38 is a system of example 37, wherein the second network comprises a cellular network. Example 39 is a system of any of examples 37-38, wherein the first network and the second network are not in direct communication with each other. Example 40 is a system of any of examples 37-38, wherein the first network and second network are each in communication with an operator network. Example 41 is a system of any of examples 37-38, wherein the first network is not protected with a network password. Example 42 is a system of any of examples 37-38, further comprising executable instructions that when executed by the processor, cause the processor to: profile the first device after connection to the first network to determine attributes of the first device. Example 43 is a system of any of examples 37-38, further comprising executable instructions that when executed by the processor, cause the processor to: perform network protection functions for the first network, the network protection functions including one or more of: threat reputation protection, botnet protection, malware protection, parental control protection, and intrusion prevention. Example 44 is a system of any of examples 37, further comprising executable instructions that when executed by the processor, cause the processor to: establish a secure communication connection to an operator network and provide information about a plurality of devices connected to the first network to a device at the operator network, the information comprising endpoint security configurations for each of the plurality of devices connected to the first network. Example 45 is a system of example 44, further comprising executable instructions that when executed by the processor, cause the processor to: receive via the secure communication connection to the operator network information pertaining to available updates of endpoint security configurations for one or more of the plurality of devices connected to the first network; and initiate a second communication to the subscriber device comprising information about the available updates. Example 46 is a system of example 45, further comprising executable instructions that when executed by the processor, cause the processor to: receive a second response to the second communication, the second response indicating an update request for one or more of the plurality of devices connected to the first network; and initiating an update of the endpoint security configuration corresponding to updates identified in the second response. Example 47 is a system of example 45, wherein the first network comprises a wireless network selected from the group consisting of: a home wireless network, a small office wireless network, and a wireless network supporting a group or organization. Example 48 is a system for monitoring a first network, comprising: a processor; a network interface connected to the first network; a memory, coupled to the processor; and executable instructions, stored on the memory, comprising instructions that when executed by the processor cause the processor to: monitor to detect a plurality of devices connected to a first network; identify attributes of the plurality of devices using passive network monitoring techniques; probe a first of the plurality of devices using an active fingerprinting technique; initiate a communication via a secure communication connection to an operator network, the communication comprising information about the first device and requesting information concerning available updates for the first device; initiate a second communication to a subscriber device comprising information about the available updates, the subscriber device known to the operator network to be associated with the first network; receive, via the secure communication connection to the operator network, information pertaining to an authorization from the subscriber device to apply one or more of the available updates; and initiate an update of the first device corresponding to the authorization. Example 49 is a method of remotely maintaining a security gateway device, the method comprising: receiving information pertaining to a first network connected to the Internet using the security gateway device, the information identifying a plurality of devices connected to the first network and a level of endpoint security software active on each of the plurality of devices; initiate a communication to a subscriber device comprising information about available updates for a first device from the plurality of devices connected to the first network, the subscriber device known to be associated with the first network; receive a response to the communication from the subscriber device, the response authorizing an update to the first device; and sending an indication to the security gateway device to initiate an update to the first device in conformance with the received response from the subscriber device. Example 50 is a machine-readable medium on which are stored instructions, comprising instructions that when executed by a programmable device, cause the programmable device to: monitor for a connection attempt by a first device to connect to a first network; identify the first device has not previously connected to the first network; initiate a communication to a subscriber device via a second network, the communication comprising information about the first device and requesting authorization to allow connection of the first device; receive a response initiated from the subscriber device authorizing connection; and allow connection of the first device to the first network based on the response. Example 51 is a machine-readable medium of example 50, wherein the second network comprises a cellular network. Example 52 is a machine-readable medium of any of examples 50-51, wherein the first network and the second network are not in direct communication with each other. Example 53 is a machine-readable medium of any of examples 50-52, wherein the first network and second network are each in communication with an operator network. Example 54 is a machine-readable medium of any of examples 50-53, wherein the first network is not protected with a network password. Example 55 is a machine-readable medium of any of examples 50-54, further comprising instructions that when executed by the programmable device, cause the programmable device to: profile the first device after connection to the first network to determine attributes of the first device. Example 56 is a machine-readable medium of any of examples 50-55, further comprising instructions that when executed by the programmable device, cause the programmable device to: perform network protection functions for the first network, the network protection functions including one or more of: threat reputation protection, botnet protection, malware protection, parental control protection, and intrusion prevention. Example 57 is a machine-readable medium of any of examples 50-56, further comprising instructions that when executed by the programmable device, cause the programmable device to: establish a secure communication connection to an operator network and provide information about a plurality of devices connected to the first network to a device at the operator network, the information comprising endpoint security configurations for each of the plurality of devices connected to the first network. Example 58 is a machine-readable medium of example 57, further comprising instructions that when executed by the programmable device, cause the programmable device to: receive via the secure communication connection to the operator network information pertaining to available updates of endpoint security configurations for one or more of the plurality of devices connected to the first network; and initiate a second communication to the subscriber device comprising information about the available updates. Example 59 is a machine-readable medium of example 58, further comprising instructions that when executed by the programmable device, cause the programmable device to: receive a second response to the second communication, the second response indicating an update request for one or more of the plurality of devices connected to the first network; and initiating an update of the endpoint security configuration corresponding to updates identified in the second response. Example 60 is a machine-readable medium of example 58, wherein the first network comprises a wireless network selected from the group consisting of: a home wireless network, a small office wireless network, and a wireless network supporting a group or organization. Example 61 is a machine-readable medium on which are stored instructions, comprising instructions that when executed by a programmable device, cause the programmable device to: monitor to detect a plurality of devices connected to a first network; identify attributes of the plurality of devices using passive network monitoring techniques; probe a first of the plurality of devices using an active fingerprinting technique; initiate a communication via a secure communication connection to an operator network, the communication comprising information about the first device and requesting information concerning available updates for the first device; initiate a second communication to a subscriber device comprising information about the available updates, the subscriber device known to the operator network to be associated with the first network; receive, via the secure communication connection to the operator network, information pertaining to an authorization from the subscriber device to apply one or more of the available updates; and initiate an update of the first device corresponding to the authorization. Example 62 is a system for monitoring connections and connection attempts to a first network, comprising: a processor; a network interface connected to the first network; a memory, coupled to the processor; and executable instructions, stored on the memory, comprising instructions that when executed by the processor cause the processor to: monitor for a connection attempt by a first device to connect to a first network; identify the first device has not previously connected to the first network; initiate a communication to a subscriber device via a second network, the communication comprising information about the first device and requesting authorization to allow connection of the first device; receive a response initiated from the subscriber device authorizing connection; and allow connection of the first device to the first network based on the response. Example 63 is a system of example 62, wherein the first network and the second network are not in direct communication with each other. Example 64 is a system for monitoring a first network, comprising: a processor; a network interface connected to the first network; a memory, coupled to the processor; and executable instructions, stored on the memory, comprising instructions that when executed by the processor cause the processor to: monitor to detect a plurality of devices connected to a first network; identify attributes of the plurality of devices using passive network monitoring techniques; probe a first of the plurality of devices using an active fingerprinting technique; initiate a communication via a secure communication connection to an operator network, the communication comprising information about the first device and requesting information concerning available updates for the first device; initiate a second communication to a subscriber device comprising information about the available updates, the subscriber device known to the operator network to be associated with the first network; receive, via the secure communication connection to the operator network, information pertaining to an authorization from the subscriber device to apply one or more of the available updates; and initiate an update of the first device corresponding to the authorization. Example 65 is a system for monitoring connections and connection attempts to a first network, comprising: a processor; a network interface connected to the first network; a memory, coupled to the processor; and executable instructions, stored on the memory, comprising instructions that when executed by the processor cause the processor to: monitor for a connection attempt by a first device to connect to a first network; identify the first device has not previously connected to the first network; initiate a communication to a subscriber device via a second network, the communication comprising information about the first device and requesting authorization to allow connection of the first device; receive a response initiated from the subscriber device authorizing connection; and allow connection of the first device to the first network based on the response. Example 66 is a system of example 65, wherein the second network comprises a cellular network. Example 67 is a system of any of examples 65-66, wherein the first network and the second network are not in direct communication with each other. Example 68 is a system of any of examples 65-66, wherein the first network and second network are each in communication with an operator network. Example 69 is a system of any of examples 65-66, wherein the first network is not protected with a network password. Example 70 is a system of any of examples 65-66, further comprising executable instructions that when executed by the processor, cause the processor to: profile the first device after connection to the first network to determine attributes of the first device. Example 71 is a system of any of examples 65-66, further comprising executable instructions that when executed by the processor, cause the processor to: perform network protection functions for the first network, the network protection functions including one or more of: threat reputation protection, botnet protection, malware protection, parental control protection, and intrusion prevention. Example 72 is a system of any of examples 65, further comprising executable instructions that when executed by the processor, cause the processor to: establish a secure communication connection to an operator network and provide information about a plurality of devices connected to the first network to a device at the operator network, the information comprising endpoint security configurations for each of the plurality of devices connected to the first network. Example 73 is a system of example 72, further comprising executable instructions that when executed by the processor, cause the processor to: receive via the secure communication connection to the operator network information pertaining to available updates of endpoint security configurations for one or more of the plurality of devices connected to the first network; and initiate a second communication to the subscriber device comprising information about the available updates. Example 74 is a system of example 73, further comprising executable instructions that when executed by the processor, cause the processor to: receive a second response to the second communication, the second response indicating an update request for one or more of the plurality of devices connected to the first network; and initiating an update of the endpoint security configuration corresponding to updates identified in the second response. Example 75 is a system of example 74, wherein the first network comprises a wireless network selected from the group consisting of: a home wireless network, a small office wireless network, and a wireless network supporting a group or organization. Example 76 is a method of operating a computer system comprising a memory and a programmable device communicatively coupled to the memory where the memory stores instructions, comprising instructions that when executed by the programmable device, cause the programmable device to: monitor for a connection attempt by a first device to connect to a first network; identify the first device has not previously connected to the first network; initiate a communication to a subscriber device via a second network, the communication comprising information about the first device and requesting authorization to allow connection of the first device; receive a response initiated from the subscriber device authorizing connection; and allow connection of the first device to the first network based on the response. Example 77 is a method of operating the computer system of example 76, wherein the second network comprises a cellular network. Example 78 is a method of operating the computer system of any of example 76-77, wherein the first network and the second network are not in direct communication with each other. Example 79 is a method of operating the computer system of any of examples 76-77, wherein the first network and second network are each in communication with an operator network. Example 80 is a method of operating the computer system any of examples 76-77, wherein the first network is not protected with a network password. Example 81 is a method of operating the computer system of any of examples 76-77, further comprising instructions that when executed by the programmable device, cause the programmable device to: profile the first device after connection to the first network to determine attributes of the first device. Example 82 is a method of operating the computer system of any of examples 76-77, further comprising instructions that when executed by the programmable device, cause the programmable device to: perform network protection functions for the first network, the network protection functions including one or more of: threat reputation protection, botnet protection, malware protection, parental control protection, and intrusion prevention. Example 83 is a method of operating the computer system of any of examples 76, further comprising instructions that when executed by the programmable device, cause the programmable device to: establish a secure communication connection to an operator network and provide information about a plurality of devices connected to the first network to a device at the operator network, the information comprising endpoint security configurations for each of the plurality of devices connected to the first network. Example 84 is a method of operating the computer system of example 83, further comprising instructions that when executed by the programmable device, cause the programmable device to: receive via the secure communication connection to the operator network information pertaining to available updates of endpoint security configurations for one or more of the plurality of devices connected to the first network; and initiate a second communication to the subscriber device comprising information about the available updates. Example 85 is a method of operating the computer system of example 83, further comprising instructions that when executed by the programmable device, cause the programmable device to: receive a second response to the second communication, the second response indicating an update request for one or more of the plurality of devices connected to the first network; and initiating an update of the endpoint security configuration corresponding to updates identified in the second response. Example 86 is a method of operating the computer system of example 84, wherein the first network comprises a wireless network selected from the group consisting of: a home wireless network, a small office wireless network, and a wireless network supporting a group or organization. Example 87 is a system for monitoring a first network, comprising: a processor; a network interface connected to the first network; a memory, coupled to the processor; and executable instructions, stored on the memory, comprising instructions that when executed by the processor cause the processor to: monitor to detect a plurality of devices connected to a first network; identify attributes of the plurality of devices using passive network monitoring techniques; probe a first of the plurality of devices using an active fingerprinting technique; initiate a communication via a secure communication connection to an operator network, the communication comprising information about the first device and requesting information concerning available updates for the first device; initiate a second communication to a subscriber device comprising information about the available updates, the subscriber device known to the operator network to be associated with the first network; receive, via the secure communication connection to the operator network, information pertaining to an authorization from the subscriber device to apply one or more of the available updates; and initiate an update of the first device corresponding to the authorization. Example 88 is a method of remotely maintaining a security gateway device, the method comprising: receiving information pertaining to a first network connected to the Internet using the security gateway device, the information identifying a plurality of devices connected to the first network and a level of endpoint security software active on each of the plurality of devices; initiate a communication to a subscriber device comprising information about available updates for a first device from the plurality of devices connected to the first network, the subscriber device known to be associated with the first network; receive a response to the communication from the subscriber device, the response authorizing an update to the first device; and sending an indication to the security gateway device to initiate an update to the first device in conformance with the received response from the subscriber device. Example 89 is a machine readable medium including code, when executed, to cause a machine to perform the method of example 88.

The above description and examples are intended to be illustrative, and not restrictive. For example, the above-described embodiments may be used in combination with each other. Many other embodiments will be apparent to those of skill in the art upon reviewing the above description.

We claim:

1. A machine-readable storage device or storage disk comprising instructions that, when executed by a programmable device, cause the programmable device to at least:

passively monitor network transmissions of a first network for a connection attempt by a first device to connect to the first network;

identify, based on the connection attempt, a new IP address that is not among a plurality of IP addresses associated with respective ones of a plurality of devices connected to the first network, the new IP address associated with the first device;

initiate a communication to a mobile subscriber device via a second network, the communication including an identity of the first device associated with the new IP address and device profiling information determined based on the new IP address, the communication initiated based on a determination as to whether the first device has previously connected to the first network, the communication to request authorization from the mobile subscriber device to allow connection of the first device to the first network, wherein the identity of the first device is determined using at least one of (i) a transport control protocol fingerprinting technique, or (ii) a hypertext transfer protocol fingerprinting technique;

receive a response to the communication from the mobile subscriber device via the second network, the response based on the identity and device profiling information included in the communication that was initiated to the mobile subscriber device, the response including one or more parameters to configure the first device to operate with the first network; and allow the connection of the first device to the first network based on the response from the mobile subscriber device received via the second network, the response to authorize the connection.

2. The machine-readable storage device or storage disk of claim 1, wherein the second network includes a cellular network.

3. The machine-readable storage device or storage disk of claim 1, wherein the first network and the second network are not in direct communication with each other.

4. The machine-readable storage device or storage disk of claim 1, wherein the first network and second network are each in communication with an operator network.

5. The machine-readable storage device or storage disk of claim 1, wherein the first network is not protected with a network password.

6. The machine-readable storage device or storage disk of claim 1, further including instructions that, when executed by the programmable device, cause the programmable device to profile the first device after the connection to the first network to determine attributes of the first device.

7. The machine-readable storage device or storage disk of claim 1, further including instructions that, when executed by the programmable device, cause the programmable device to perform network protection functions for the first network, the network protection functions including one or more of: threat reputation protection, botnet protection, malware protection, parental control protection, and intrusion prevention.

8. The machine-readable storage device or storage disk of claim 1, further including instructions that, when executed by the programmable device, cause the programmable device to:

establish a secure communication connection to an operator network; and provide information about a plurality of devices connected to the first network to a device at the operator network, the information including endpoint security configurations for ones of the plurality of devices connected to the first network.

9. The machine-readable storage device or storage disk of claim 8, further including instructions that, when executed by the programmable device, cause the programmable device to:

obtain, via the secure communication connection to the operator network, information pertaining to available updates of endpoint security configurations for one or more of the plurality of devices connected to the first network; and initiate a second communication to the mobile subscriber device including information about the available updates.

10. The machine-readable storage device or storage disk of claim 9, further including instructions that, when executed by the programmable device, cause the programmable device to:

obtain a second response to the second communication, the second response to indicate an update request for one or more of the plurality of devices connected to the first network; and initiate an update of the endpoint security configuration corresponding to updates identified in the second response.

11. The machine-readable storage device or storage disk of claim 9, wherein the first network includes at least one of: a home wireless network, an office wireless network, and a wireless network supporting a group or organization.

12. A system to monitor connections and connection attempts to a first network, the system comprising:

a network interface to connect to the first network;

memory including executable instructions; and a processor to execute the instructions to at least:

detect a connection attempt by a first device to connect to the first network;

identify, based on the connection attempt, a new IP address that is not among a plurality of IP addresses associated with respective ones of a plurality of devices connected to the first network, the new IP address associated with the first device;

initiate a communication to a mobile subscriber device via a second network, the communication including an identity of the first device associated with the new IP address and device profiling information determined based on the new IP address, the communication initiated based on a determination as to whether the first device has previously connected to the first network, the communication to request authorization from the mobile subscriber device to allow connection of the first device to the first network, wherein the identity of the first device is determined using at least one of (i) a transport control protocol fingerprinting technique or (ii) a hypertext transfer protocol fingerprinting technique;

receive a response to the communication from the mobile subscriber device via the second network, the response based on the identity and device profiling information included in the communication that was initiated to the mobile subscriber device, the response including one or more parameters to configure the first device to operate with the first network; and allow the connection of the first device to the first network based on the response from the mobile subscriber device received via the second network, the response to authorize the connection.

13. The system of claim 12, wherein the second network includes a cellular network.

14. The system of claim 12, wherein the first network and the second network are not in direct communication with each other.

15. The system of claim 12, wherein the first network and the second network are each in communication with an operator network.

16. The system of claim 12, wherein the first network is not protected with a network password.

17. The system of claim 12, wherein the processor is to profile the first device after the connection to the first network to determine attributes of the first device.

18. The system of claim 12, wherein the processor is to perform one or more of: threat reputation protection, botnet protection, malware protection, parental control protection, and intrusion prevention.

19. The system of claim 12, wherein the processor is to establish a secure communication connection to an operator network and provide information about a plurality of devices connected to the first network to a device at the operator network, the information including endpoint security configurations for corresponding ones of the plurality of devices connected to the first network.

20. The system of claim 19, wherein the processor is to:
obtain, via the secure communication connection to the operator network, information pertaining to available updates of endpoint security configurations for one or more of the plurality of devices connected to the first network; and
initiate a second communication to the mobile subscriber device including information about the available updates.

21. The system of claim 20, wherein the processor is to:
obtain a second response to the second communication, the second response to indicate an update request for one or more of the plurality of devices connected to the first network; and
initiate an update of the endpoint security configuration corresponding to updates identified in the second response.

22. The system of claim 20, wherein the first network includes at least one of: a home wireless network, an office wireless network, and a wireless network supporting a group or organization.

* * * * *